(12) United States Patent
Zaplitny et al.

(10) Patent No.: US 10,808,677 B2
(45) Date of Patent: Oct. 20, 2020

(54) FLUID DRIVEN VERTICAL AXIS TURBINE

(71) Applicant: Clean Green Energy LLC, Brighton, MI (US)

(72) Inventors: Bryan Joseph Zaplitny, Brighton, MI (US); Rupert Stephen Tull de Salis, Ann Arbor, MI (US)

(73) Assignee: Clean Green Energy LLC, Brighton, MI (US)

( * ) Notice: Subject to any disclaimer, the term of this patent is extended or adjusted under 35 U.S.C. 154(b) by 58 days.

(21) Appl. No.: 15/951,157

(22) Filed: Apr. 11, 2018

(65) Prior Publication Data
US 2018/0230964 A1 Aug. 16, 2018

Related U.S. Application Data

(63) Continuation of application No. 14/638,291, filed on Mar. 4, 2015, now Pat. No. 9,970,410, which is a continuation of application No. 13/401,815, filed on Feb. 21, 2012, now Pat. No. 8,985,948.

(51) Int. Cl.
*F03D 1/06* (2006.01)
*F03D 13/10* (2016.01)
*F03D 3/06* (2006.01)
*F03D 13/40* (2016.01)
(Continued)

(52) U.S. Cl.
CPC .......... *F03D 1/0633* (2013.01); *F03D 3/062* (2013.01); *F03D 13/10* (2016.05); *F03D 13/20* (2016.05); *F03D 13/40* (2016.05); *F05B 2230/60* (2013.01); *F05B 2230/604* (2013.01); *F05B 2230/608* (2013.01); *F05B 2240/212* (2013.01); *F05B 2240/302* (2013.01); *F05B 2240/31* (2013.01); *F05B 2240/40* (2013.01); *F05B 2240/912* (2013.01); *F05B 2240/91521* (2013.01); *F05B 2240/941* (2013.01); *F05B 2260/30* (2013.01); *F16C 11/10* (2013.01); *F16C 2360/31* (2013.01); *Y02E 10/721* (2013.01); *Y02E 10/728* (2013.01); *Y02E 10/74* (2013.01); *Y02P 70/523* (2015.11); *Y10T 29/53* (2015.01); *Y10T 403/32254* (2015.01)

(58) Field of Classification Search
None
See application file for complete search history.

(56) References Cited

U.S. PATENT DOCUMENTS

| 1,835,018 A | 12/1931 | Darrieus |
| 3,918,839 A | 11/1975 | Blackwell |
| 4,329,116 A | 5/1982 | Ljungstrom |

(Continued)

FOREIGN PATENT DOCUMENTS

| CA | 1151072 | 8/1983 |
| DE | 3825241 | 10/1989 |

(Continued)

*Primary Examiner* — Brian P Wolcott
*Assistant Examiner* — Jason G Davis
(74) *Attorney, Agent, or Firm* — Shalom Wertsberger; Saltamar Innovations

(57) ABSTRACT

A fluid turbine comprises a rotor rotatable in use about an axis transverse to the direction of fluid flow, the rotor having a first part carrying a plurality of arcuate blades that may be arranged selectably in compact straight shapes or in arcuate shapes and a second part journalled in a base structure by two or more bearings.

13 Claims, 24 Drawing Sheets

(51) Int. Cl.
*F03D 13/20* (2016.01)
*F16C 11/10* (2006.01)

(56) References Cited

U.S. PATENT DOCUMENTS

| | | | |
|---|---|---|---|
| 4,421,458 A | 12/1983 | Allan | |
| 4,422,825 A | 12/1983 | Boswell | |
| 4,449,053 A | 5/1984 | Kutcher | |
| 4,624,624 A | 11/1986 | Yum | |
| 5,252,029 A | 10/1993 | Barnes | |
| 5,375,324 A | 12/1994 | Wallace et al. | |
| 5,499,904 A | 3/1996 | Wallace et al. | |
| 5,531,567 A * | 7/1996 | Hulls | F03D 3/062 416/194 |
| 6,238,124 B1 | 5/2001 | Merlo | |
| 7,648,303 B2 | 1/2010 | Zorzo | |
| 8,042,596 B2 | 10/2011 | Llagostera Forns | |
| 8,322,989 B2 | 12/2012 | Ozkul | |
| 8,546,972 B2 | 10/2013 | Dewng | |
| 9,249,778 B2 * | 2/2016 | Paulin | F03D 3/005 |
| 2008/0267777 A1 | 10/2008 | Lux | |
| 2010/0083604 A1 | 4/2010 | Vangsy | |
| 2010/0133846 A1 | 6/2010 | Lin | |
| 2010/0172759 A1 | 7/2010 | Sullivan | |
| 2011/0042958 A1 | 2/2011 | Vander Straeten | |
| 2012/0063915 A1 | 3/2012 | Kawabata | |
| 2012/0195757 A1 | 8/2012 | Paulin | |

FOREIGN PATENT DOCUMENTS

| | | |
|---|---|---|
| EP | 1630415 | 3/2006 |
| FR | 2298707 | 8/1976 |
| GB | 494961 | 11/1938 |
| JP | S5770961 | 5/1982 |
| JP | 2003293936 | 10/2003 |
| JP | 2006316751 | 11/2006 |
| SE | 533140 | 11/2008 |
| WO | WO9535444 | 12/1995 |
| WO | WO9007647 | 7/1999 |
| WO | WO0244558 | 6/2002 |
| WO | JP2005083207 | 3/2005 |
| WO | WO2005061173 | 7/2005 |
| WO | WO2007140397 | 12/2007 |
| WO | WO2009130590 | 10/2009 |
| WO | WO2010021733 | 2/2010 |
| WO | WO2011109611 | 9/2011 |

* cited by examiner

FLUID DRIVEN VERTICAL AXIS TURBINE

FIELD OF THE INVENTION

The present invention relates to a fluid driven vertical axis turbine for use in generating electrical power.

BACKGROUND OF THE INVENTION

Wind-powered electrical generators in current use commonly employ a horizontal-axis, propeller-like wind turbine to capture power from air flowing parallel to the rotational axis of the turbine blades. However, as the wind direction can change, such turbines need to be mounted so that they may pivot about a vertical axis in order that they may face directly into the wind. The blades of such a turbine are generally three in number and extend radially from a central hub, to which they are attached at one end, to form a propeller that is driven by the wind. Generally the cross sectional area and pitch angle of each blade vary with increasing distance from the hub. At least one crane is required to assemble and erect such a wind turbine, unless it is sufficiently small to be assembled by hand.

The present invention is concerned with a design of turbine known as a Darrieus wind turbine. In such turbines, the blades rotate about an axis perpendicular to the wind direction, and as such can be driven by wind from any direction, without the need for re-orientation. The blades of a Darrieus turbine are generally attached to a rotor shaft at both ends, and their cross-section is generally constant in shape and pitch angle.

In U.S. Pat. No. 1,835,018, G. J. M. Darrieus disclosed a three-bladed wind turbine mounted on a vertical rotating shaft. Since that time, the Darrieus turbine has received substantial attention as an effective means of power generation.

Various configurations of generator and blades have been tried in Darrieus turbines, but presented disadvantages in requiring cranes for the purposes of installation, especially when the number of blades exceeds two. The number of blades is generally three, as shown for example in U.S. Pat. Nos. 1,835,018 and 4,449,053, as they provide advantages of reduced torque fluctuations, improved appearance and improved rotational balance.

In the installation of Darrieus turbines, cranes have generally been used to lift and attach blades at a significant height from the ground, requiring expensive equipment and teams of workers. It is also necessary in this case to provide extra strength in the blades, and or a custom-built lifting frame, to prevent blade distortion during installation.

U.S. Pat. No. 4,449,053 discloses a vertical axis wind turbine of the Darrieus type with guy ropes, means for lubricating an upper bearing, and a hinged tower, for assembly on the ground before erection. This proposal has the advantage of enabling the assembly of blades to the turbine in closer proximity to the ground before raising the turbine, but it will readily be seen that the assembly of three evenly spaced blades, as shown in the patent, would nevertheless require joints to be completed at significant height above the ground, in other than very small turbines. Additionally, no means is provided for unloading and positioning the parts of the turbine for assembly, and so a crane is still required in some form.

U.S. Pat. Nos. 5,375,324 and 5,499,904 disclose similar vertical axis turbines but do not provide means for assembly without the use of cranes.

U.S. Pat. No. 5,252,029 discloses a vertical axis turbine with a hinged base and a method of erection without the use of cranes, but relies for support on guy wires and anchors, and provides no means to address the problem of attaching blades while the turbine is on the ground. This patent has the disadvantages that guy wires occupy space over a considerable area, and that it is necessary, as described above, to use a crane for attachment of blades to the turbine, except where the turbine is of a small size, and except where the number of blades is less than three.

SUMMARY OF THE INVENTION

In accordance with the preferred embodiment, there is provided a fluid turbine having a rotor rotatable about an axis disposed in use substantially transverse to the direction of fluid flow, and a plurality of arcuate blades connected at their opposite ends to the rotor, wherein at least one blade is formed of at least three segments coupled together by joints, at least two of the joints being articulated for permitting the mutual inclination of two adjacent segments to be varied while the ends of the blade are connected to the rotor. The mutual inclination is understood to mean the angle formed between the two adjacent blade segments. It is noted that the term arcuate should be broadly construed to denote a shape approximating an arc and made by at least three blade segments, as well as to denote the smooth geometrical arcuate shape. It is further noted that the blade segments may be straight or curved, however the closer the approximation to an arc, the less will be the bending moments induced by rotation, and the more aesthetically pleasing will be the appearance of the turbine.

Optionally, the blade segments may be selectably arranged in two or more mutual inclinations by a powered remote control system.

In one embodiment, each articulated joint permits the mutual inclination of the two blade segments to be selectively locked in at least one position, enabling a rigid arcuate blade to be formed from at least four segments, providing a more functionally useful arcuate shape than may be achieved with three or two segments, while also enabling the blade shape to be unlocked and flattened into a compact, substantially flat form suitable for transportation and protection from high winds. Optionally the two blade segments may be locked in a plurality of mutual inclinations, including the substantially flat form.

At least one end of each arcuate blade may be secured to the rotor by a hinged connection to a hub displaceable in the axial direction of the rotor.

The hub may be displaceable along the rotor by a powered remote control system and optionally lockable in at least one position.

By using blades comprising segments that are joined by articulated hinged joints, that are structurally strong, compact, and which preferably can be locked into at least one fixed position, embodiments of the invention provide a Darrieus turbine with blades the shape of which can be changed between a flat configuration, suitable for transportation and erection and a curved configuration required for operation as a turbine. Optionally, it further makes it possible to change the blade configuration under remote and/or automated control, for example to prevent damage to the turbine during storms.

In a second aspect of the invention, there is provided an articulated joint for connecting first and second members having elongate internal cavities, the joint comprising at least one bridge piece rigidly secured in use at one end within the internal cavity of the first member and pivotably received at the other end within the internal cavity of the second member, wherein a chock is mounted in the second member and is movable between a retracted position in which the members may pivot relative to one another and a locking position in which the chock is wedged between the said other end of the bridge piece and a wall of the internal cavity of the second member to prevent pivotal movement of the two members relative to one another.

U.S. Pat. No. 8,042,596 B2 discloses an elbow type joint for an awning mechanism, comprising an articulating hinged joint, but with no means for locking the joint into a fixed position.

U.S. Pat. No. 7,648,303 discloses an articulating hinged joint for a mop handle, which can be locked in a single position, but cannot be locked in two positions.

U.S. Pat. No. 6,238,124 discloses an articulating joint that can be locked in multiple positions.

U.S. Pat. No. 4,624,624 discloses a collapsible vertical axis windmill which comprises four straight wings arranged in a rhombic form having a pair of opposed corners fitted on a shaft and auxiliary wings each provided on each of the main wings. The upper one of the pair of corners on the shaft is fitted via a bearing capable of movement along the shaft. The other pair of opposed corners of the rhombic structure each have a hinged structure capable of variation of the angle. However the rhombic fashion dictated by the arrangement does not allow the efficient form of an arcuate blade. Further the hinges do not provide locking, and as the design calls for the displacement of the wings from the vertical shaft to increase responsive to higher wind velocity, it presents higher stresses which may damage the turbine.

U.S. patent application Ser. No. 13/304,505 to Tull de Salis et al. discloses a turbine blade and a turbine using the same. The turbine has a plurality of generally arcuate blades that are rotatable about a rotational axis transverse to the direction of fluid flow. Each blade comprises a plurality of separately formed straight segments that are straight when unstressed, and that are joined to form a blade in which at least some adjacent segments are inclined at an angle to one another. Using such blades may be beneficial for various embodiments of the present application. This application is incorporated herein by reference in its entirety.

U.S. patent application Ser. No. 13/304,538 to Tull de Salis et al. now issued as US Patent 8,83,199, discloses a fluid turbine having a rotor rotatable in use about an axis transverse to the direction of fluid flow. The rotor has a first part carrying a plurality of arcuate blades and a second part journaled in a base structure by means of two or more bearings. All the bearings are arranged on the same side of the blades so that the first part of the rotor is cantilever supported in the base structure. This application is incorporated herein by reference in its entirety.

BRIEF DESCRIPTION OF THE DRAWINGS

Different aspects of the invention will now be described further, by way of example, with reference to the accompanying drawings, in which.

DETAILED DESCRIPTION OF THE PREFERRED EMBODIMENT

Figure 1:
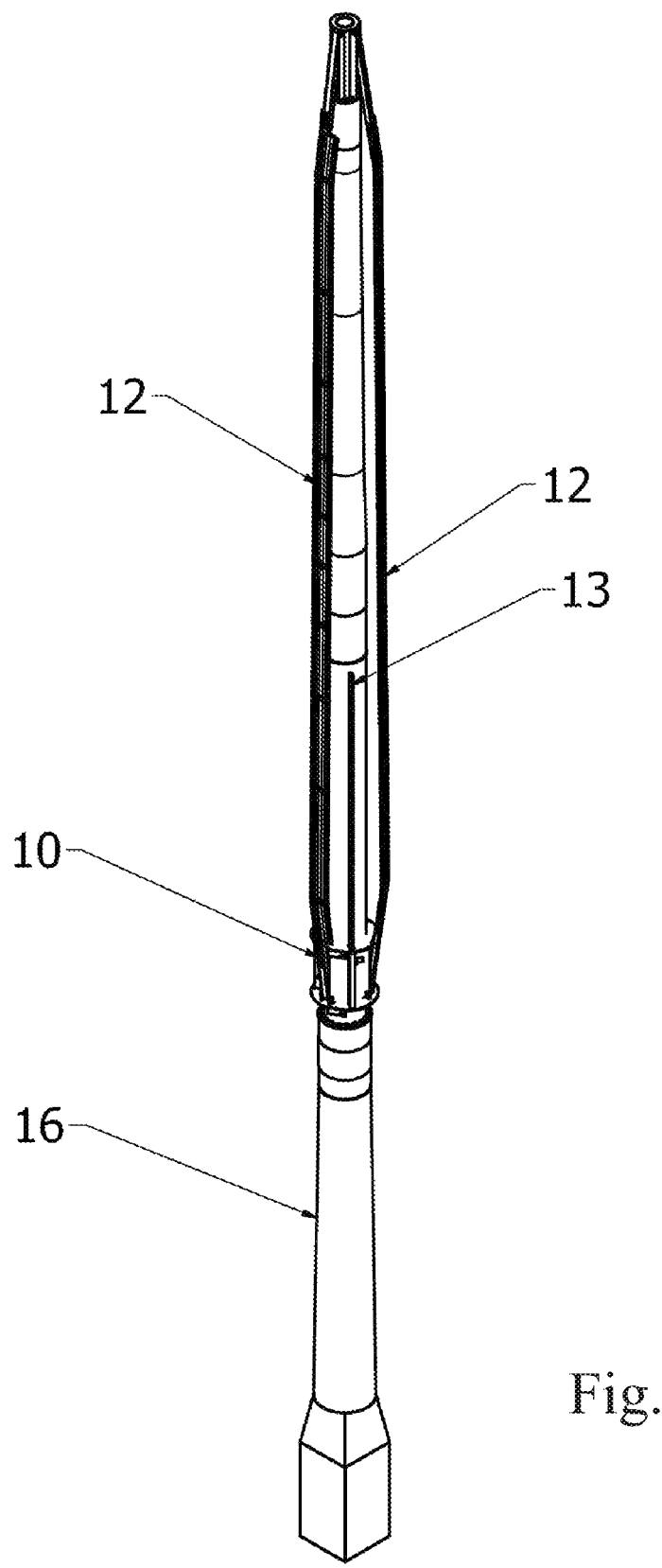
FIG. 1 is a perspective view of a wind turbine generator, with its blades collapsed into a compact arrangement.

FIG. 1 shows a schematic view of a wind turbine 10. Three arcuate blades 12 of aerofoil cross-sectional shape are attached to a rotating, preferably tapered, vertical rotor 13, rotatably mounted on the upper end of a stationary support structure 16, known as a tower. In this view, the blades are folded into a compact, flattened arrangement for transportation and installation or for protection against extreme weather.

Figure 2:
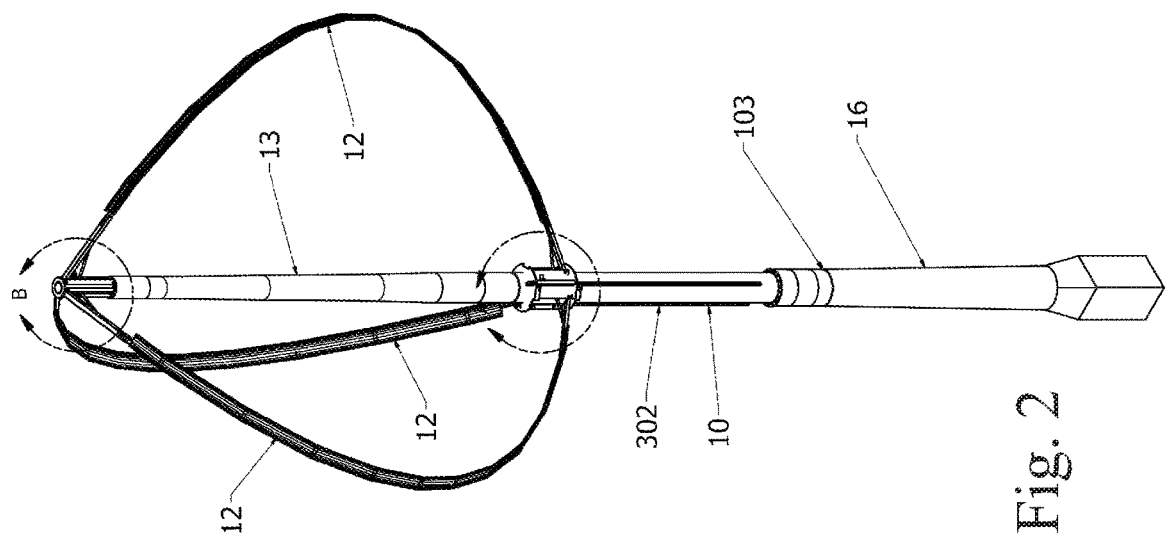
FIG. 2 is a perspective view of the same wind turbine generator, with its blades extended into a curved arrangement for normal operation.

FIG. 2 shows the turbine with blades 12 in a curved position, as for normal operation. When rotating in the presence of sufficient wind, the blades 12, by virtue of their shape, capture kinetic energy from the wind and convert it into rotational torque and motion as known, for example, from U.S. Pat. No. 1,835,018. All parts of the turbine that are situated above an upper bearing 103 are rotating elements. It is seen that the blades comprise a plurality of blade segments. The angle formed between each two adjacent segments, of at least three of those segments, is variable. The ability to vary the angle between each one of the at least three blade segments and the segment adjacent thereto, allows the blade to approximate an arcuate shape. Preferably more than three segments are provided, to allow the blade to more closely simulate the arc shape. The exact number of blade segments is dictated by a technical compromise between the economy of having few parts such as blade segments and articulated joints, strength requirements, the efficiency provided by an optimized blade shape for the wind conditions, stress distribution, and the like.

The blade state may be modified at least between an open and a closed state. Optionally other states may be selected. Preferably the blade segments are substantially straight when unstressed.

Figure 3:
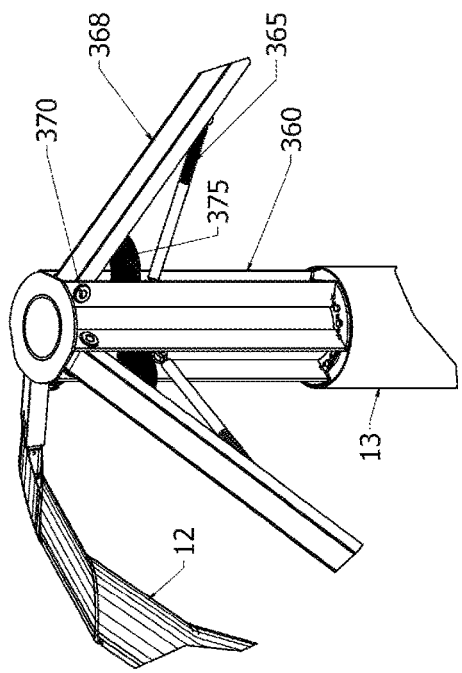
FIG. 3 is a perspective view of the topmost part of the turbine, showing the upper attachment of the blades.

FIG. 3 shows the attachment of the three blades 12 by connectors 368 to an upper hub 360, which is attached to the upper rotor 13. The connectors 368 are hinged about pins 370 and supported by hydraulic cylinders 365, which assist in moving the blades between open and compact positions. The cylinders 365 are preferably of the type known as double-acting self-locking, and are thereby able to provide rigid support to the connectors 368 when fully extended, and they release their locked state only when actuated by hydraulic pressure in a closing direction. In another embodiment, hydraulic pressure may be maintained indefinitely by the hydraulic supply equipment, so that non-locking cylinders may be used. Corrugated flexible tubes 375 allow for hydraulic hoses to pass from a hollow cavity inside the rotor 13 to cavities inside the connectors 368, and thence to cavities inside the blades 12, providing control pressure to actuate hydraulic mechanisms. Heated air, other fluids, cables and or wiring may also pass into the blades 12 by the same means.

Figure 4:
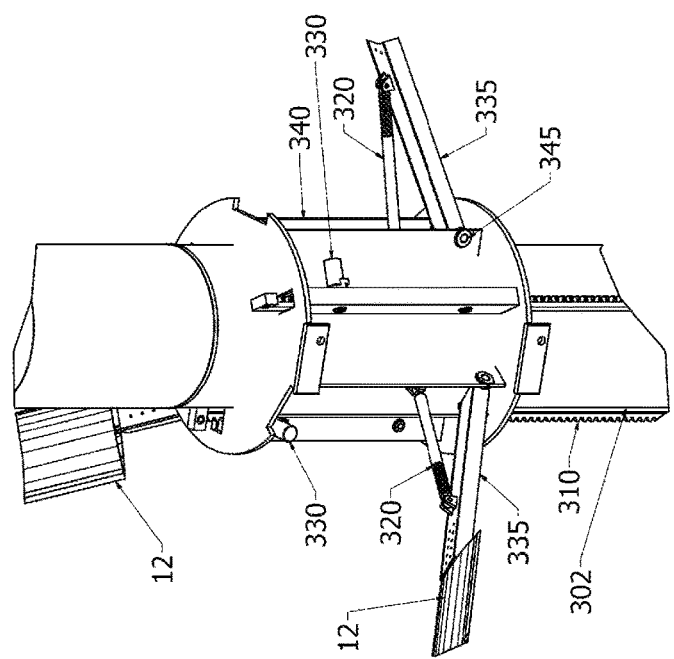
FIG. 4 is a perspective view of a mid region of the turbine, showing the lower attachment of the blades.

FIG. 4 shows the attachment of the three blades 12 via connectors 335 to a lower hub having the form of a collar 340, which is able to slide vertically upon a lower part 302 of the rotor 13. As with the upper hub, the connectors 335 are hinged about pins 345 and supported by hydraulic cylinders 320, which assist in moving the blades between open and compact positions. The cylinders 320 are preferably of the type known as double-acting self-locking, and are thereby able to provide rigid support to the connectors 335 when fully extended, and they release their locked state only when actuated by hydraulic pressure in a closing direction. In another embodiment, hydraulic pressure may be maintained indefinitely by the hydraulic supply equipment, so that non-locking cylinders may be used. The collar 340 is moved up and down by locking hydraulic motors 330, which engage with racks 310. Hydraulic pressure is provided to the hydraulic motors via hoses passing through the blades 12, leading from the upper ends of the blades as described above. The racks 310 also provide locking between the collar 340 and the lower rotor 302, preventing relative rotation. Other examples of locking mechanisms may be implemented. It will further be clear to the skilled in the art the functions of the upper and lower hub may be interchanged, and in certain embodiments, both hubs are displaceable along the rotor, and the specifications and the claims extend to such embodiments.

Figure 5:
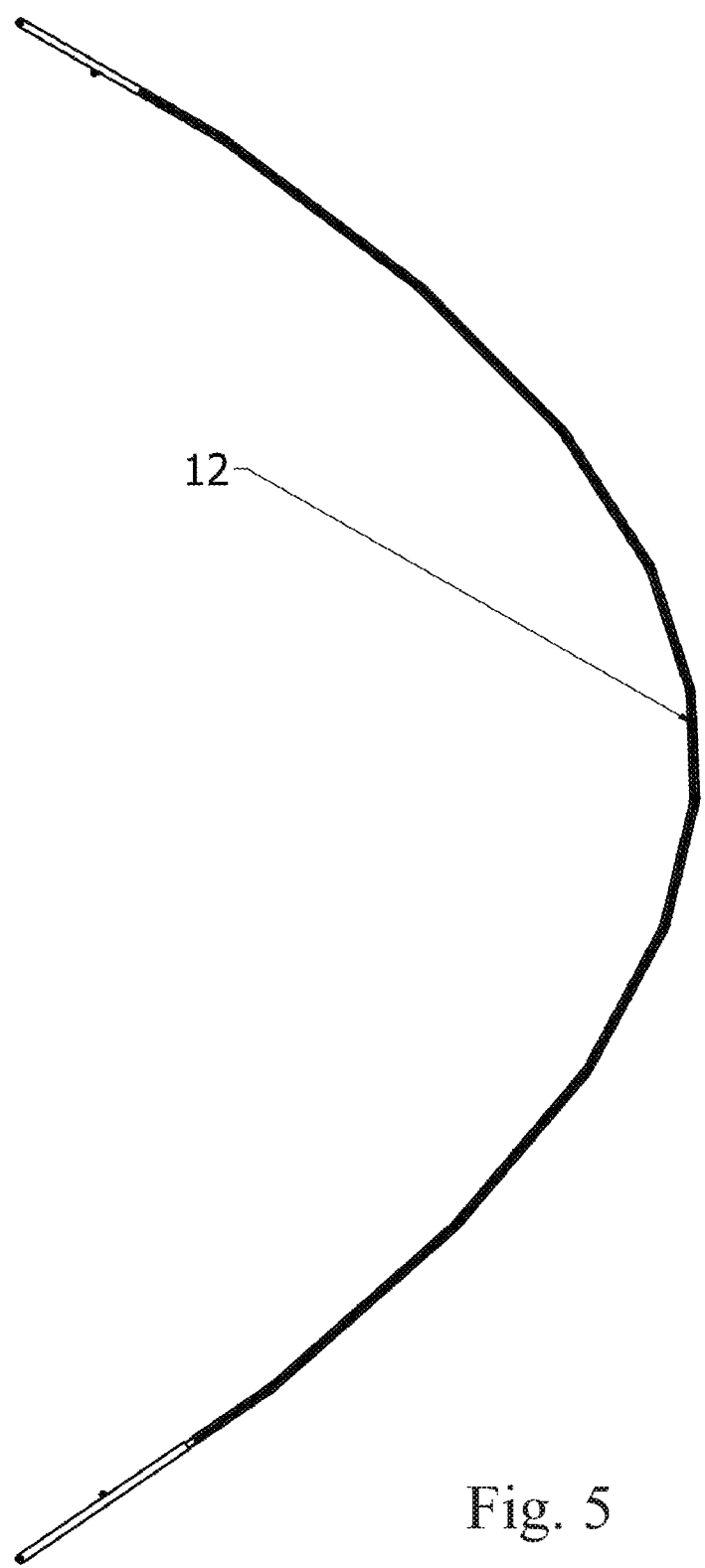
FIG. 5 is a side view of a single blade in curved configuration.

FIG. 5 is a side view of a single blade 12, in curved arrangement, showing the curved shape taken by the blade for normal operation. The blades are made up of segments that can be pivoted relative to one another using articulated joints. An embodiment is described below with reference to FIGS. 6 to 10.

Each blade segment 410 has an outer skin 419 of aerofoil cross section 419 having internal cavities of which the walls are strengthened by reinforcements 422. In some embodiments the reinforcements are extruded. A bridge piece 423 is rigidly mounted to one end in the reinforcement 422 of one segment, and is pivotably connected to the reinforcement of the other segment to allow the two segments to pivot relative to one another.

Figure 6:
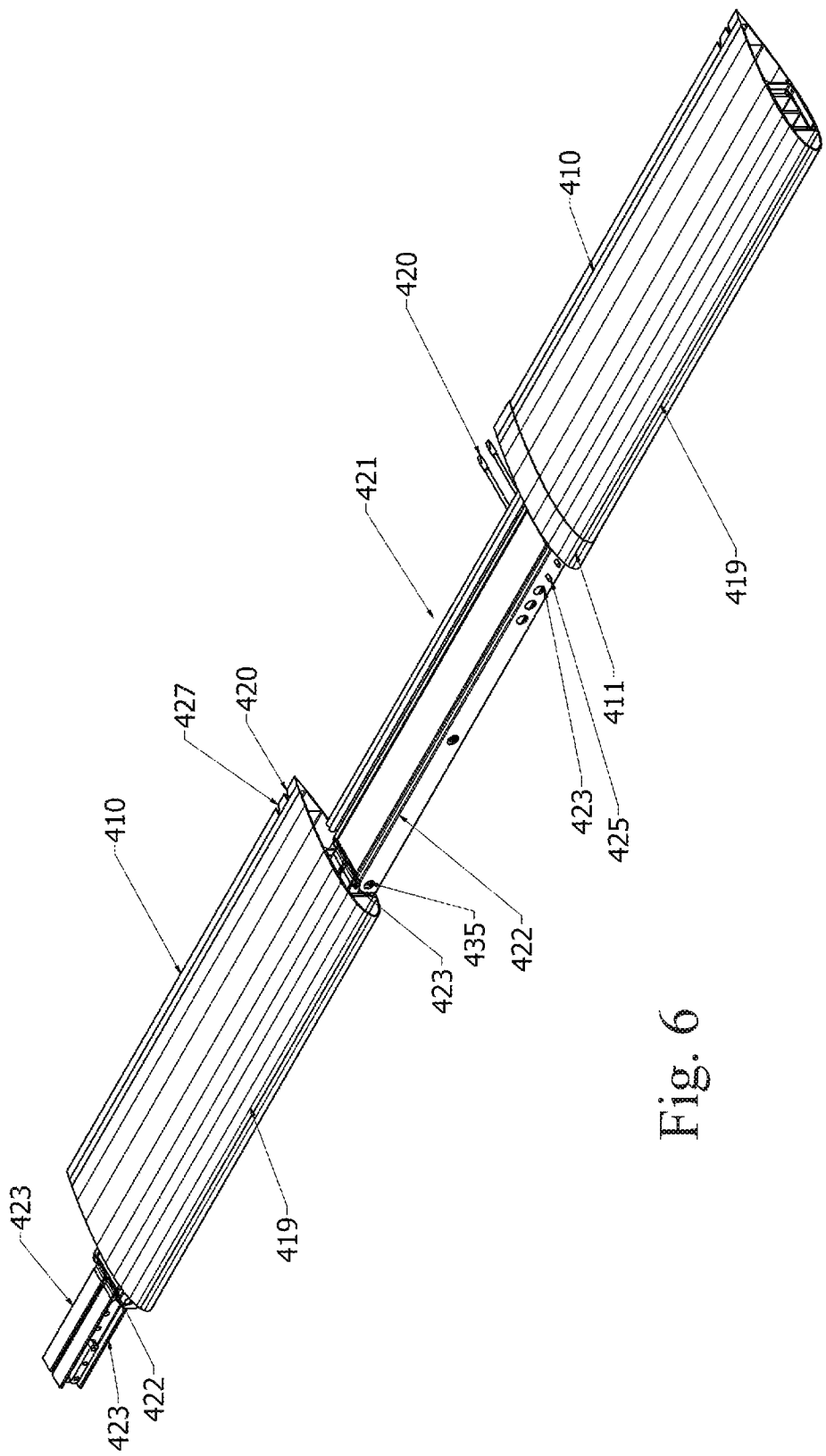
FIG. 6 is a perspective view of there blade segments with the aerofoil outer skin of the central segment removed to exposed the inner components.
Figure 7:
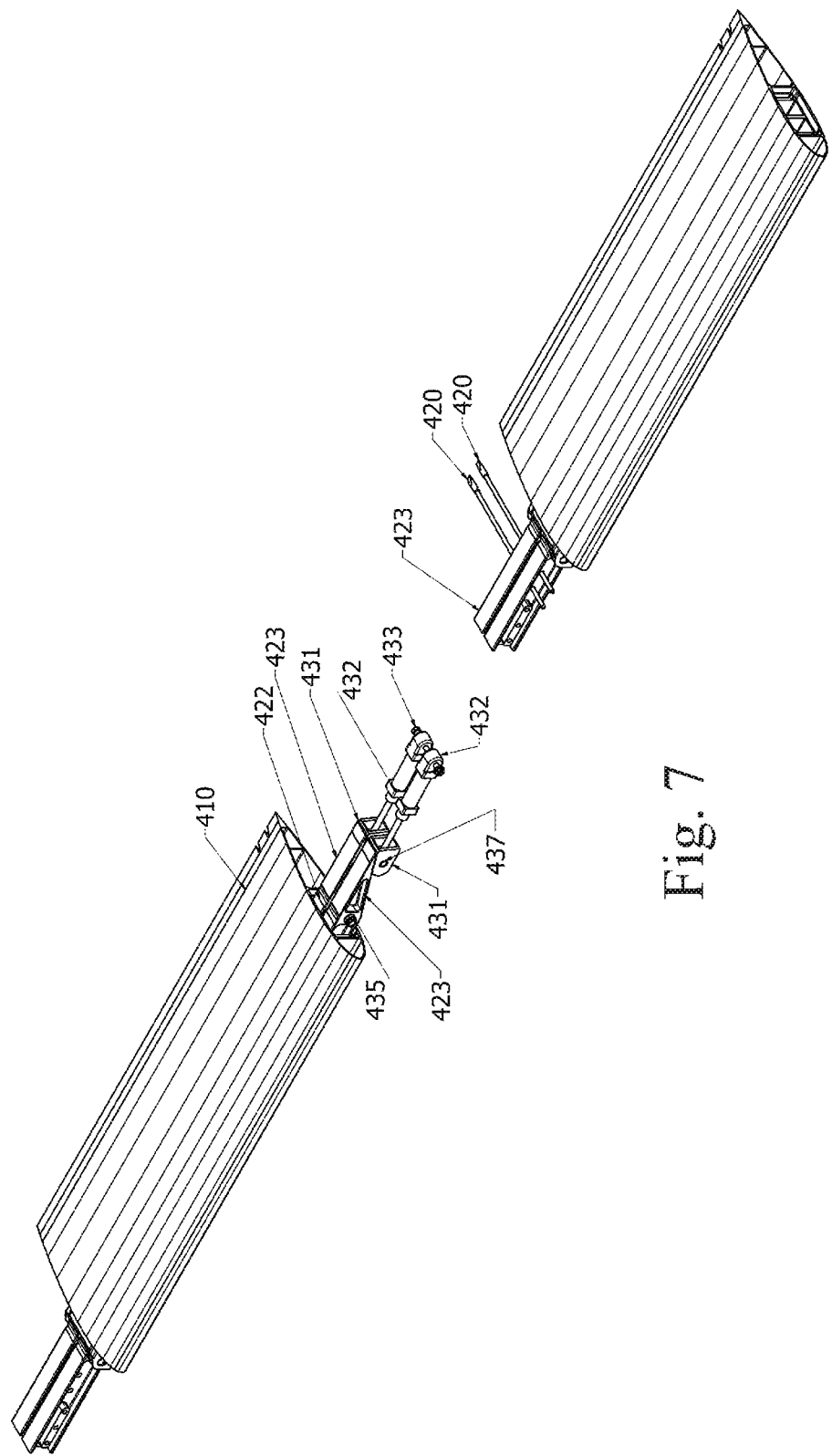
FIG. 7 is a perspective view of the same three segments with further parts removed to display more components of an articulated joint.

FIGS. 6 and 7 show two segments 410 of one blade 12, arranged in the compact or straight position, with and without the reinforcements 422. Flexible shroud pieces 411, preferably formed from elastomeric material, are provided to cover the joints between adjacent segments. In an alternative embodiment (not shown) the shroud pieces may extend further in the longitudinal direction of the blade, far enough to cover a complete blade segment or even a complete blade.

Figure 8:
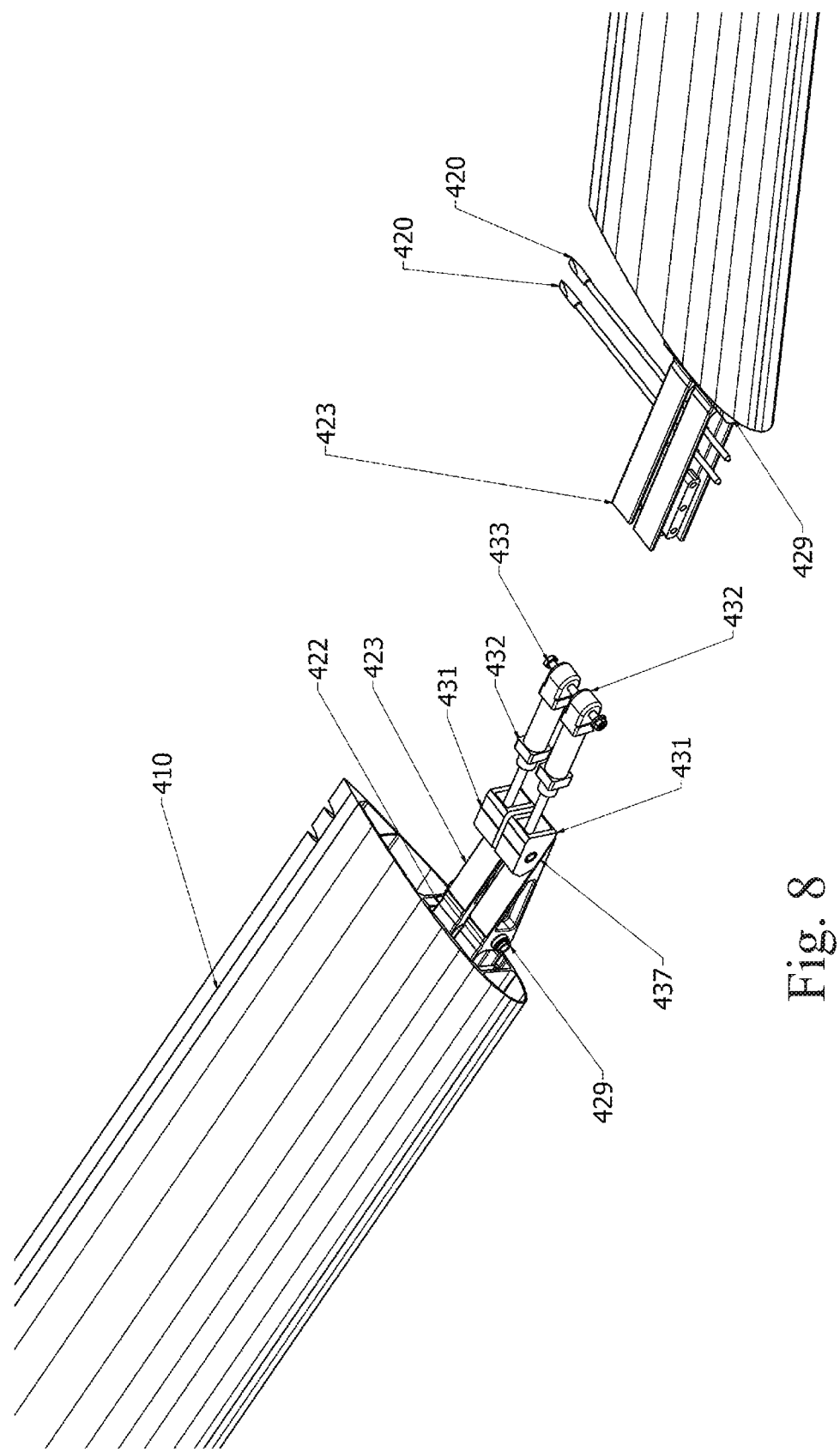
FIG. 8 is a similar perspective view to FIG. 7, showing when the three segments are in a mutually inclined position to form a curved blade.

FIG. 8 shows the same arrangement as FIG. 7, with the two segments inclined relative to one another. As seen in FIGS. 6, 7 and 8, the aerofoil outer skin 419 is secured longitudinally to the reinforcements 422 by two pins 420, inserted through holes 427 originating at the tail part of the aerofoil. These pins locate inside holes 425 drilled through the tubular reinforcements 422. Each bridge piece 423, which may be formed by way of example utilizing machining, casting or forging, provides a robust connection between each reinforcement 422 and the next, and is articulated via a hinge pin 435, to allow adjacent sections to be positioned at an angle to one another, or aligned in a straight line, selectably.

Figure 9:
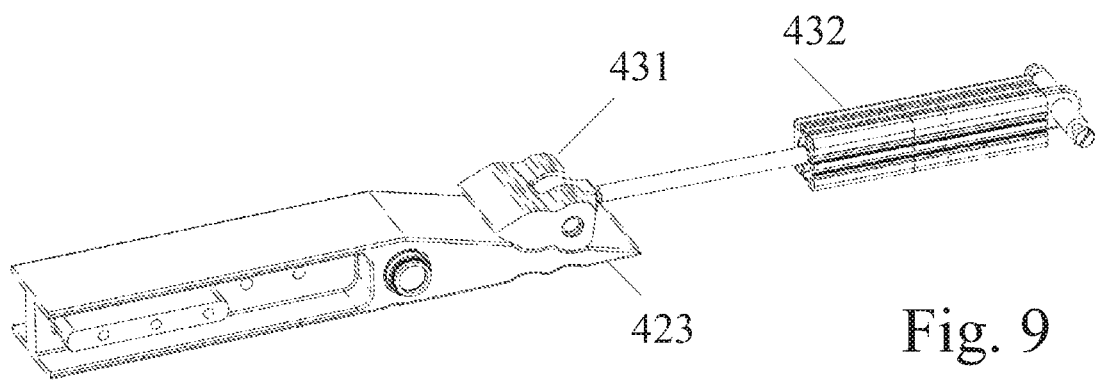
FIG. 9 is a perspective view of the components of an embodiment of an articulated joint.

FIG. 9 shows the same arrangement as FIG. 8, but with further parts removed for clarity. An articulated angle may be created between blade sections 410 about pin 435 in the following fashion. In the compact or straight position, the bridge pieces 423 are secured in position relative to the sections 422 by wedges 431, which are held in place by double-acting locking hydraulic cylinders 432, to which they are affixed by rotatable pin joints 437. The cylinders are in turn located to holes in sections 422 by bolts 433.

FIG. 9 shows a perspective view of the bridge piece 423 that is secured to one of the reinforcements 422 and of a chock 431 operated by a hydraulic cylinder 432 that is mounted in the other tubular reinforcement 422. The chock 431 is in the form of a wedge that is pivotably mounted on the end of the piston rod of the hydraulic cylinder. The end of the bridge piece 423 is tapered on at least one side. Both sides of the end of the bridge piece have depressions 438 as seen in FIG. 10B, to receive mating formations 439 on the sides of the chock 431.

Figure 10A:
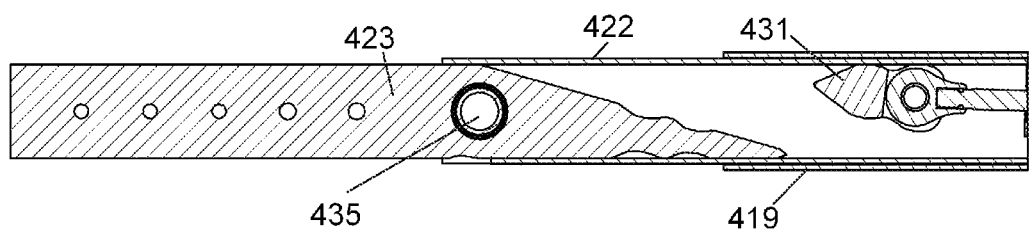
FIGS. 10A, 10B and 10C show sections of the articulated joints of FIG. 9 when it is unlocked, locked in a straight configuration, and locked in an inclined configuration, respectively.

The operation of the lockable articulated joints is best understood by reference to FIGS. 10A to 10O. In FIG. 10A, the chock 431 is retracted by the hydraulic cylinder 432 away from the end of the bridge piece 423. In this position, the bridge piece can move freely about the pin 435 to allow the two segments of the blade 12 to pivot relative to one another.

Figure 10B:
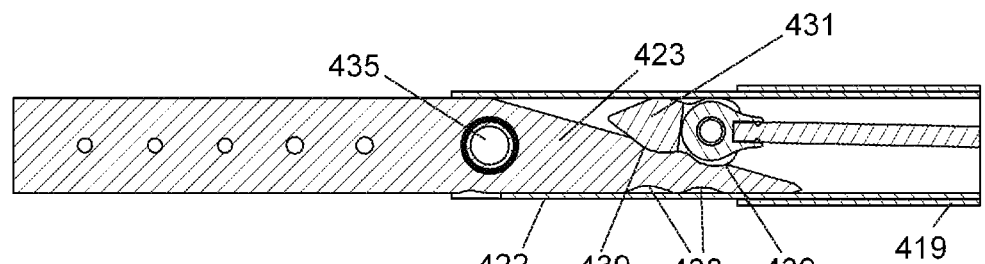
Figure 10C:
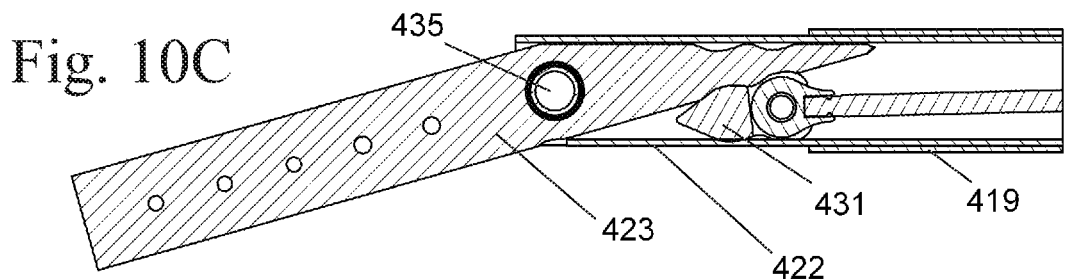

When the blade segments 410 are aligned with one another, as shown in FIG. 10B, they may be locked in this position by moving the chock 431 such that it is wedged between the upper surface of the bridge piece 423 and the arresting wall formed by the reinforcement 422 of the next segment. The chock will now act to prevent any pivotal motion between the two blade segments and the formations 439 will retain the chock in this locked position without the need to resort to a locking hydraulic cylinder 432.

As shown in FIG. 10O, the chock 431 can also be used to prevent articulation when the two segments are pivoted relative to one another, acting this time between the lower face of the bridge piece 423 and the inner wall of the tubular reinforcement 422.

Figure 11:
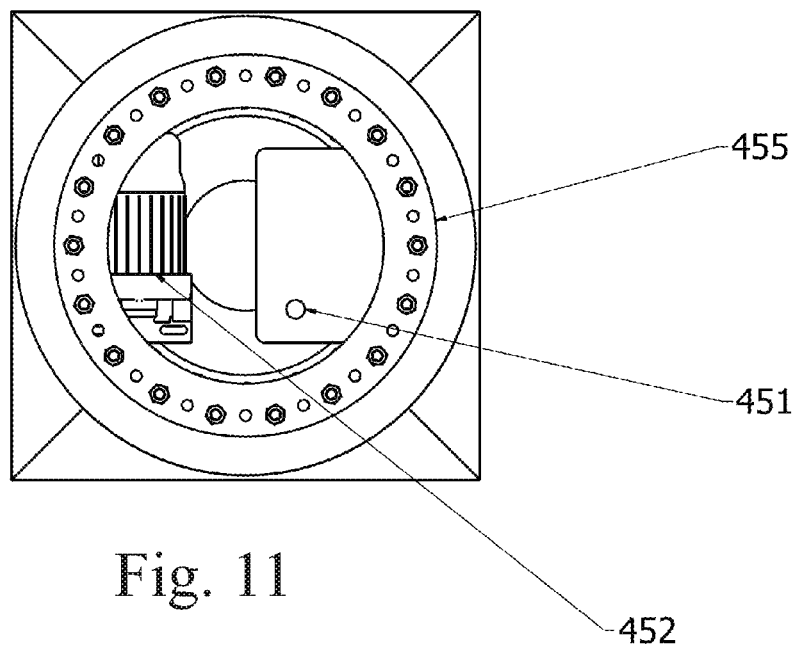
FIG. 11 is a plan view from above of the lower most part of the rotor of the turbine showing hydraulic power supply equipment.
Figure 12:
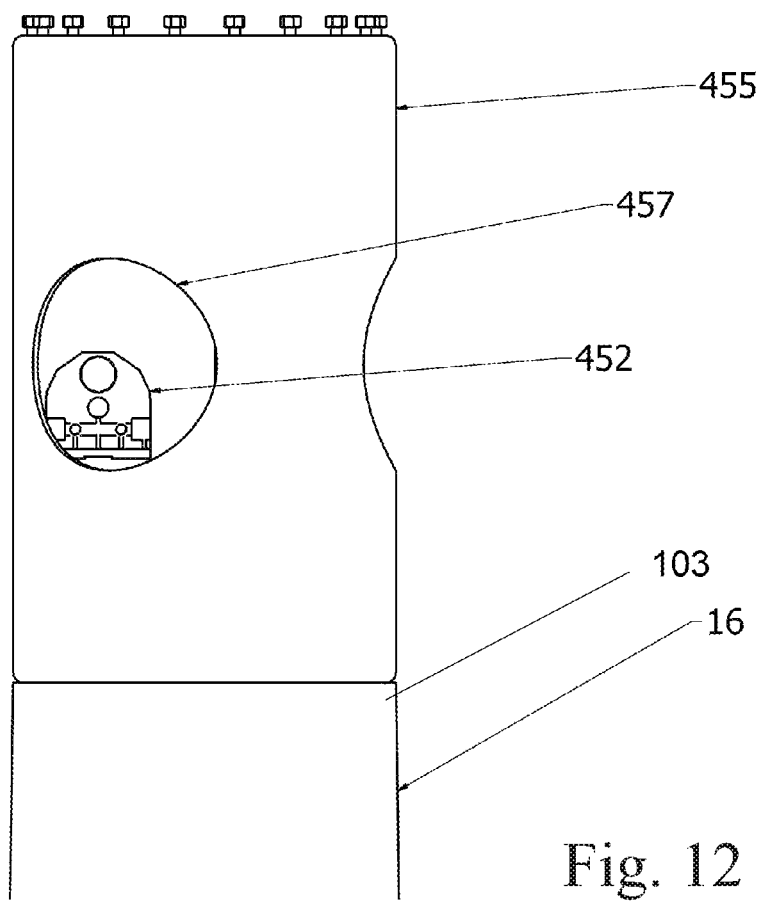
FIG. 12 is a side view of the part of the rotor shown in FIG. 11.

FIGS. 11 and 12 show top and side views of the lowest visible rotating part of the turbine, this being the base 455 of the rotor which is attached via the upper bearing 103 to the turbine tower 16. The adjacent parts of the turbine are removed for clarity. Hydraulic power, for positioning the blades, is provided by a hydraulic pump 452 and reservoir, 451. Access holes 457 are provided for maintenance purposes, and cylindrical covers (not shown) cover these holes when access is not required.

Figure 13:
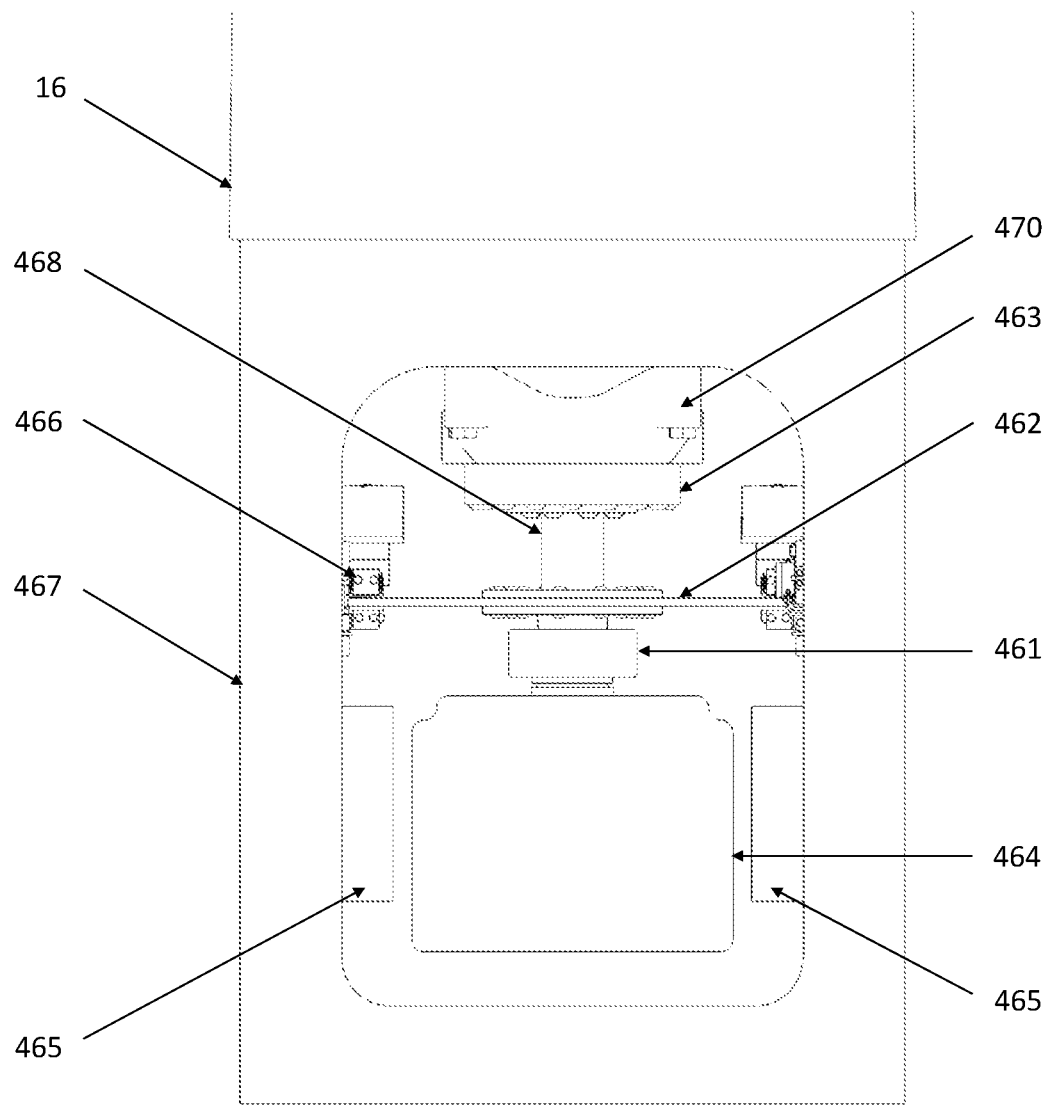
FIG. 13 shows a side view of the base of the tower, with side covers removed.

FIG. 13 shows a side view of the base 467 of the tower 16, with side covers removed. Electrical power for the hydraulic system is provided via a brush module 461, giving electrical connections between control cabinet 465 and electrical cables enclosed by a lower driveshaft flange 468, which forms part of the rotating assembly. The driveshaft is connected to the flange 468, and thence to the generator 464 via a lower bearing 463 that is supported by a bearing carrier 470. Brakes 466 acting on a brake disk 462 are provided to stop the turbine. The driveshaft extends vertically upwards and connects to the rotor base, seen in FIG. 12, and is supported rotatably by the upper bearing 103.

Yet another aspect of the invention provides for an assembly and method of installation of elongated structures which are made of at least a lower and an upper sections, each having a mating end which may be coupled to the mating end of the corresponding section. Non limiting examples of such structures include vertical fluid turbines such as by way of example, the embodiments described above, as well as horizontal axis turbines, towers, and the like. Preferably the installation structure is used both for transporting the elongated structure and for assembling and erecting it onto its base, equivalently referred to as 'footing'.

The installation assembly comprises of a frame having at least a first and a second receivers, disposed adjacent to each other, such as one receiver above the other, or in a side-by side arrangement. Each receiver is constructed to receive and support a section of the elongated structure. Preferably one or both receivers have a section support for the respective elongated structure section, which allows the section to be moved relative to the receiver. In certain embodiments, portions of the receivers themselves act as section supports. The term receiver should be construed broadly as various types of structure that provide support and/or positioning for the elongated structure sections, and not necessarily chambers or other framework that receive the section, in whole or in part, therein. Thus by way of example, in the depicted embodiments a receiver for the lower section may comprise substantial frame, while a receiver for the upper section may comprise primarily of tracks 226, which offer both support for the upper section, while further providing motion thereto as described.

The installation assembly has supports, generally referred to as outriggers, which provide at least for supporting the frame at selectable heights, and preferably enables the installation assembly to lift and lower itself independent of external lifting devices such as an independent crane. The outriggers are preferably extendable, and may provide horizontal movement in certain embodiments.

The installation assembly further comprises an aligner, which comprises an actuator set, which allows mutual aligning of the upper and lower sections of the elongated structure. The actuator set is capable of moving at least one of the sections of the elongated structure so as to achieve alignment therebetween, and may impart articulating, sliding, lifting, movement and the like, to at least one of the sections, to bring the upper and lower sections into mutual axial alignment, thus allowing mating of the upper and lower sections.

The aligner comprises certain mechanisms, such as, by way of non-limiting example, a longitudinal displacer to controllably displace the upper section of the elongated structure, lifting mechanism to lift and/or lower at least one of the sections, an angular motion actuator for tilting a section, and the like. Preferably those movements are carried out while the elongated structure portion is supported by the corresponding section support, or by the receivers.

Further, the depicted installation assembly has a base reference system allowing precise placement of the installation assembly to a footing which will support the elongated structure when mounted. The installation assembly further comprises an erector to erect the structure on its footing.

Generally in order to achieve the operations of assembly and erection of the elongated structure, the installation assembly is aligned to the base at a known orientation, the aligner brings the elongated structure section into substantially axial alignment, the mating ends are mated using any desired method, and the erector moves the elongated structure into substantially vertical orientation above the base. The elongated structure is secured onto the base, and the installation assembly may be withdrawn if desired.

Utilizing the installation assembly offers significant advantages over the present methods of erecting elongated structures in general, and wind turbine in particular, as the frame and elongate structure form a single unit that can easily be transported, by truck, rail, ship and the like. Additional advantage is provided by obviating the need for on-site assembly, which is much more expensive than plant assembly. Thus the preferred embodiment of this aspect of the invention provides ease of transportation as well as ease of joining the two sections of the elongated structure, and other work, to be performed near ground level, as compared to current methods which requires dangerous work at significant heights, which consumes more time and is more expensive. Furthermore, this aspect of the invention provides additional saving by obviating the need to bring and use cranes, lifts, and the like at the erection site.

FIGS. 14-26 show preferred embodiments of this aspect, utilizing wind turbines, as the elongated structure for clarity.

Figure 14:
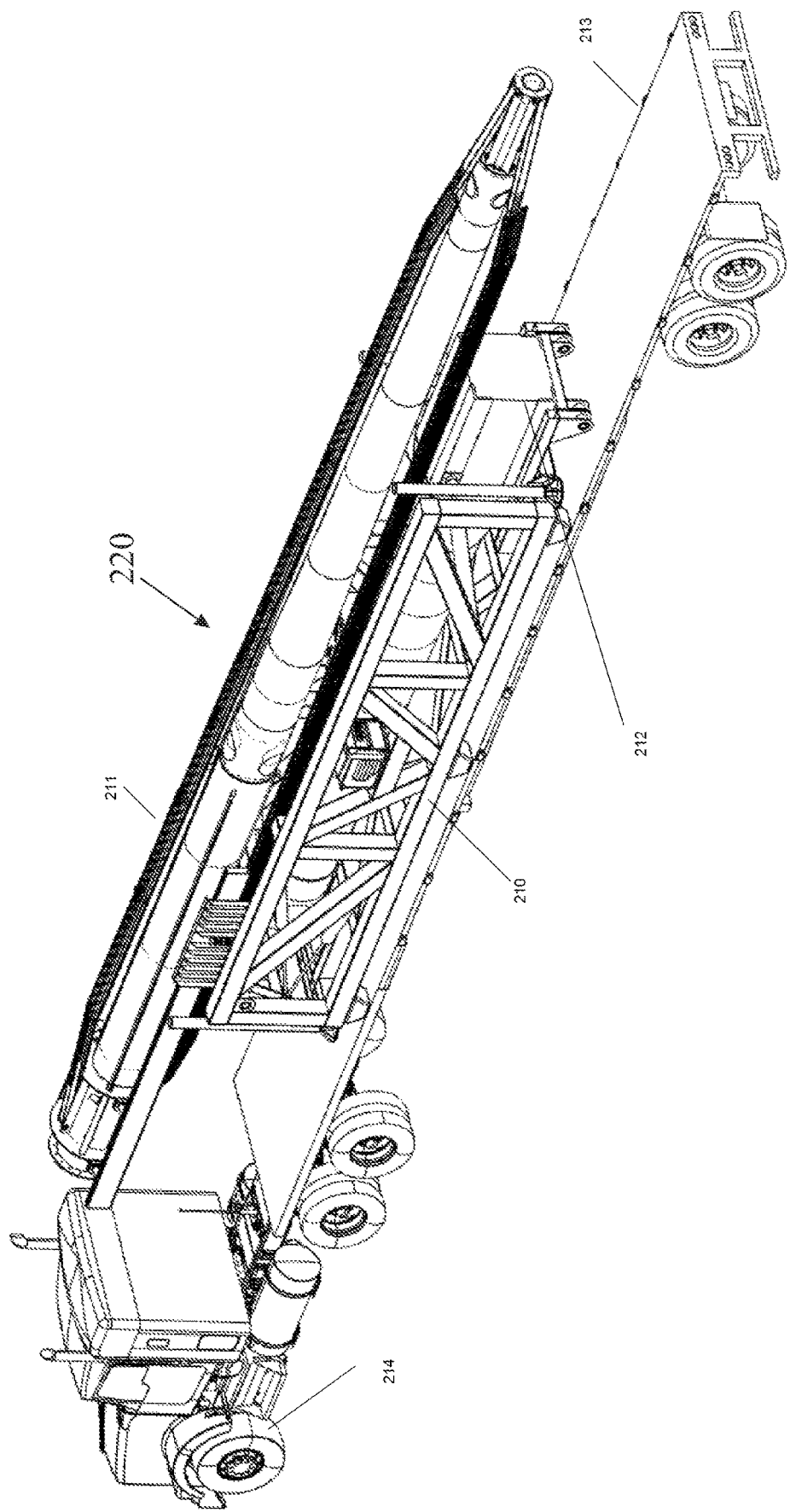
FIG. 14 shows a perspective view of a turbine and an installation frame, loaded onto a truck for transportation.

FIG. 14 shows a perspective view of an installation assembly, comprising the upper section 211 and lower section 212 of the turbine and an installation frame 210, loaded for transportation onto the trailer 213 of a truck 214.

Figure 15:
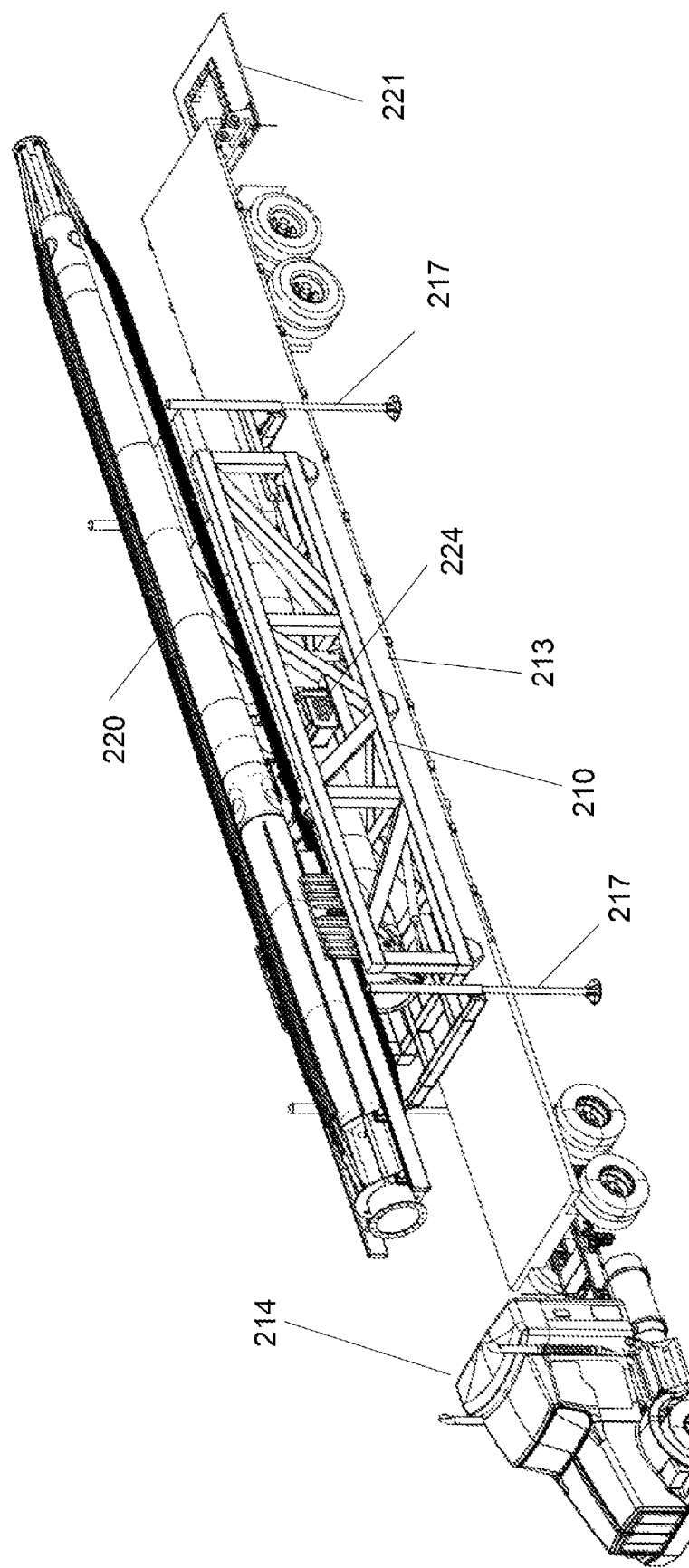
FIG. 15 shows the truck of FIG. 14 with powered outriggers lowered from the installation frame to reach the ground and to lift the installation frame clear of the trailer of the truck when near a footing.

When the truck arrives at the installation site, it reverses its trailer 213 up to footing 221 as shown in FIG. 15, and hydraulically powered outriggers 217 are extended to reach the ground and raise the installation frame and the two parts of the turbine off the trailer 213 in the manner shown in FIG. 15. The electrically driven source of hydraulic power forms part of the installation frame and in case electrical supply is not available a generator 224 may be included in the installation frame 210, hydraulic or electric power may be derived from the truck, or any other convenient source. It is noted that in certain embodiments the outriggers may simply set the assembly at desired orientation, and raising and lowering may be carried out by other methods such as jacks, lifts, and the like.

Figure 16:
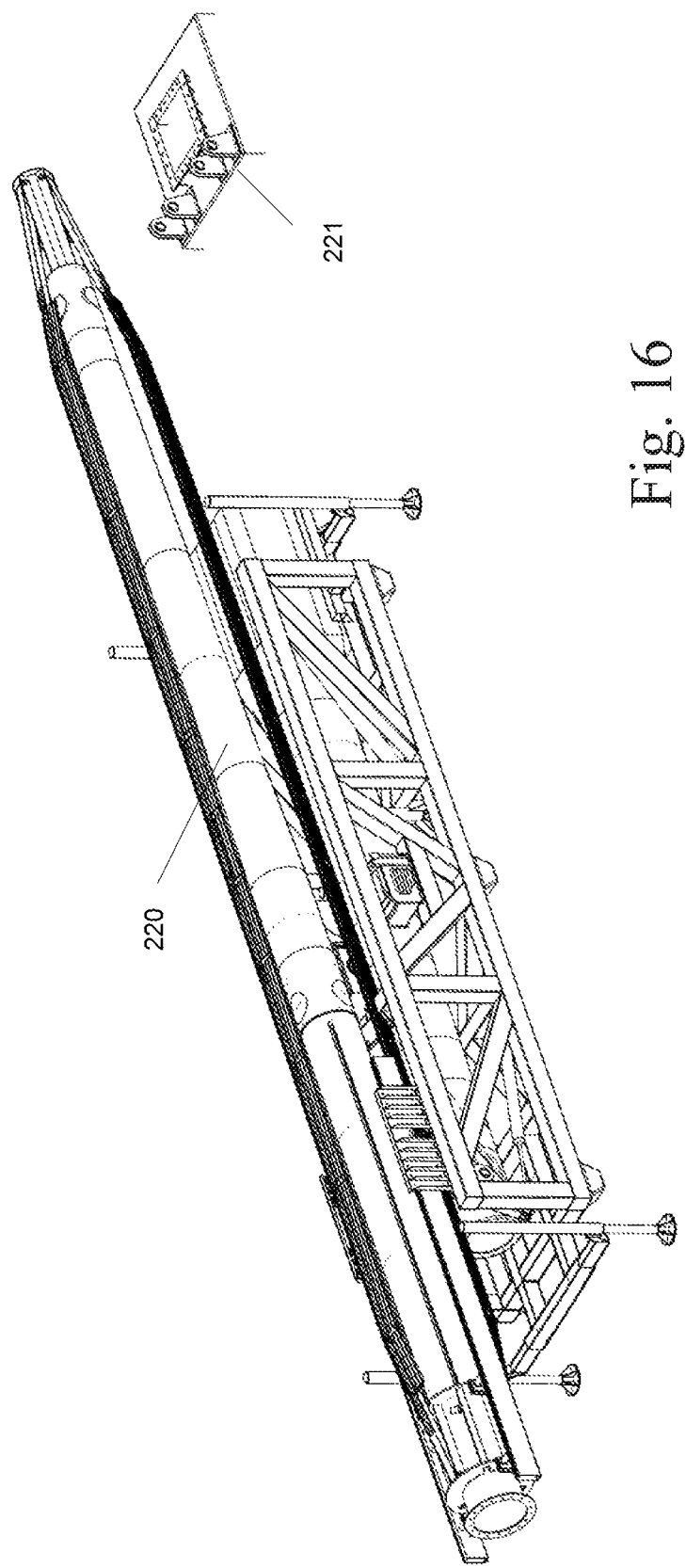
FIG. 16 shows the installation assembly 220 standing on the ground in proximity to the footing after removal of the truck and its trailer.

In the next step, shown in FIG. 16, the truck and the trailer are driven away and the frame may be lowered by the outriggers 217.

Figure 17:
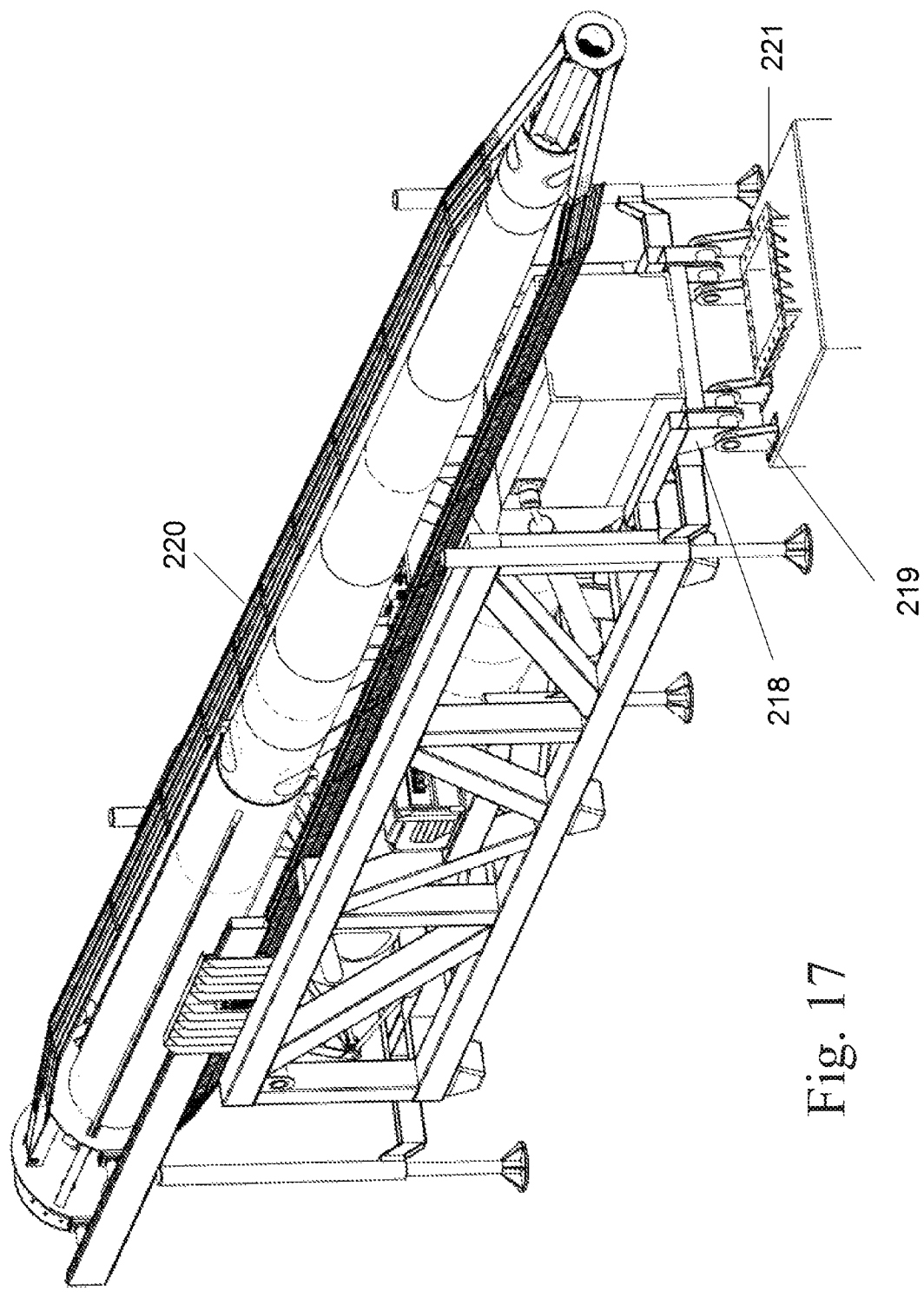
FIG. 17 shows the installation frame standing on the ground and positioned to allow connection of the base of the tower to the footing.

FIG. 17 shows the installation assembly 220 positioned to allow connection of hinge plates 218 with hinge plates 219 in the footing 221. The hinge plates in this exemplary embodiment act as an attachment point for setting the assembly at a known orientation to the footing. Optionally, the position of the frame may be adjusted using the hydraulic outriggers and/or the truck and semi trailer by a "walking" motion, wherein the frame is alternately raised, horizontally moved and lowered. The skilled in the art will recognize that other devices, such as jacks, cranes, and the like may be utilized for precise relative placement of the hinge plates 218 and 219.

Figure 18:
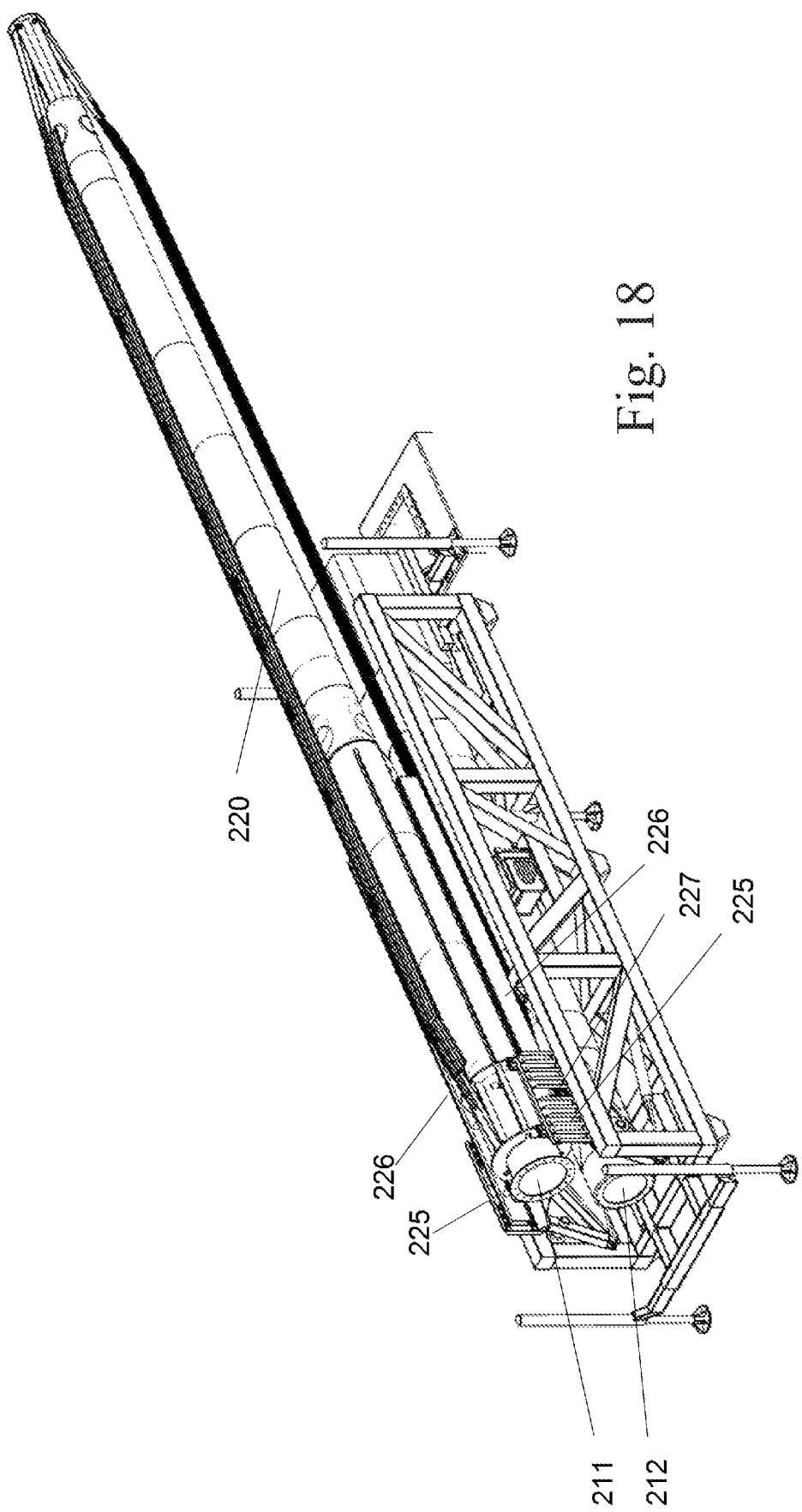
FIG. 18 shows the installation frame with the upper parts of the turbine moved longitudinally to align the ends of the upper and lower parts vertically with one another.

FIG. 18 shows the installation assembly 220 with the turbine upper section 211 moved longitudinally to align with the end of the lower section 212. This motion may be actuated by roller sliding mechanisms 225 acting on longitudinal tracks 226 with power from motor units 227, which in this embodiment form a longitudinal displacer.

Figure 19:
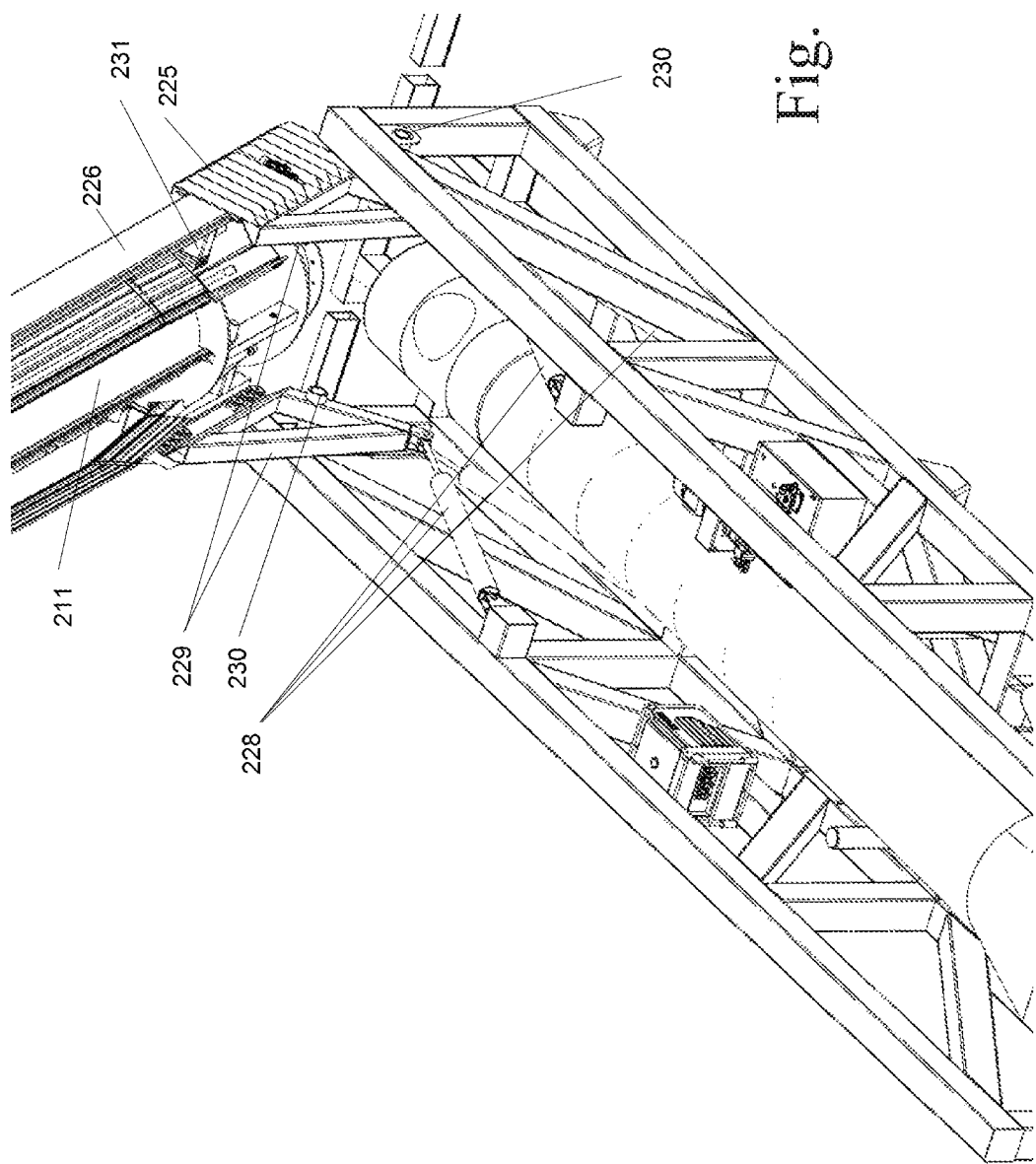
FIG. 19 shows the upper parts of the turbine upper section 211 being partially rotated in a vertical plane about a horizontal axis at one end of the installation frame.

FIG. 19 shows the installation assembly 220 with the turbine upper section 211 partially rotated in a vertical plane about one end. Hydraulic cylinders 228 move hinged subframes 229 about hinge joints 230, raising the turbine upper section 211 via roller slider mechanisms 225 and longitudinal tracks 226, which are connected to the turbine upper section via connectors 231. Thus in this embodiment, the hydraulic cylinders 228, sub-frame 229, and hinge joints 230 all form a lateral displacer.

Figure 20:
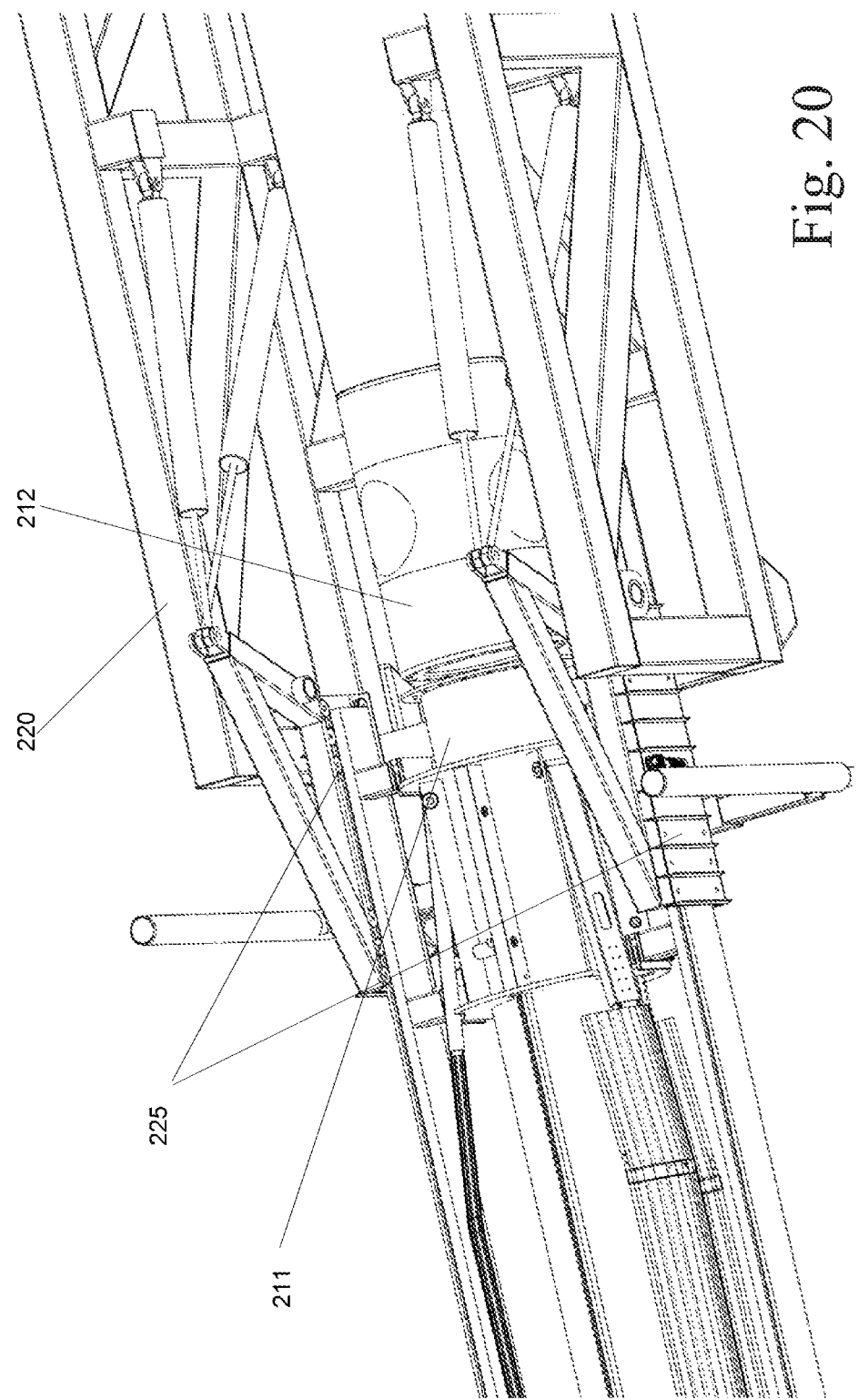
FIG. 20 shows the upper parts of the turbine fully rotated through 180° to align the upper and lower parts of the turbine axially with one another.

FIG. 20 shows the installation assembly 220 with the turbine upper section 211 fully rotated through 180° in a vertical plane about one end, to lie in a horizontal position, preferably leaving a gap between the upper section 211 and lower section 212. The gap may be adjusted by use of the roller sliding mechanisms 225. Hydraulic hoses, electrical cables, gas ducts and or other devices may now be connected between cavities enclosed by the upper section 211 and lower section 212, using access provided by the gap.

Figure 21:
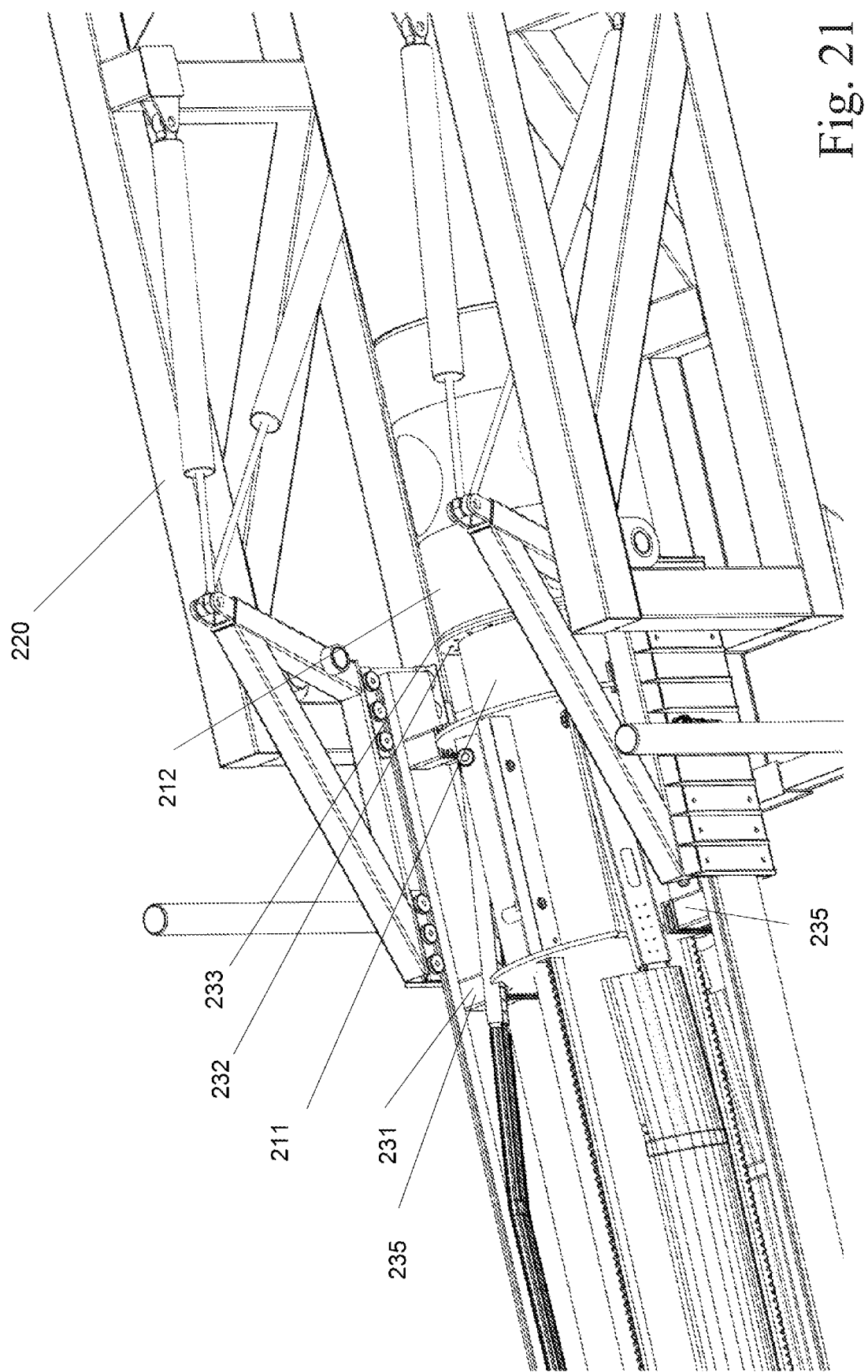
FIG. 21 shows the same view as FIG. 20 with a gap closed between the upper and lower parts of the turbine, FIG. 22 shown the whole turbine being raised vertically.

FIG. 21 shows the view of FIG. 20 with the gap between the upper section 211 and the lower section 212 closed. Connectors, preferably lock-bolt fasteners, may now be used to complete the connection between flanges 232 and 233 mounted on the upper section 211 and the lower section 212.

The embodiment described above is but one embodiment of the displacer actuators which operate by moving the upper section into axial alignment with the lower section. The skilled in the art would recognize that other types of motion and appropriate actuators thereto may be selected, and the selection of the desired motion and actuators to bring the two parts into alignment is a matter of technical choice.

Figure 22:
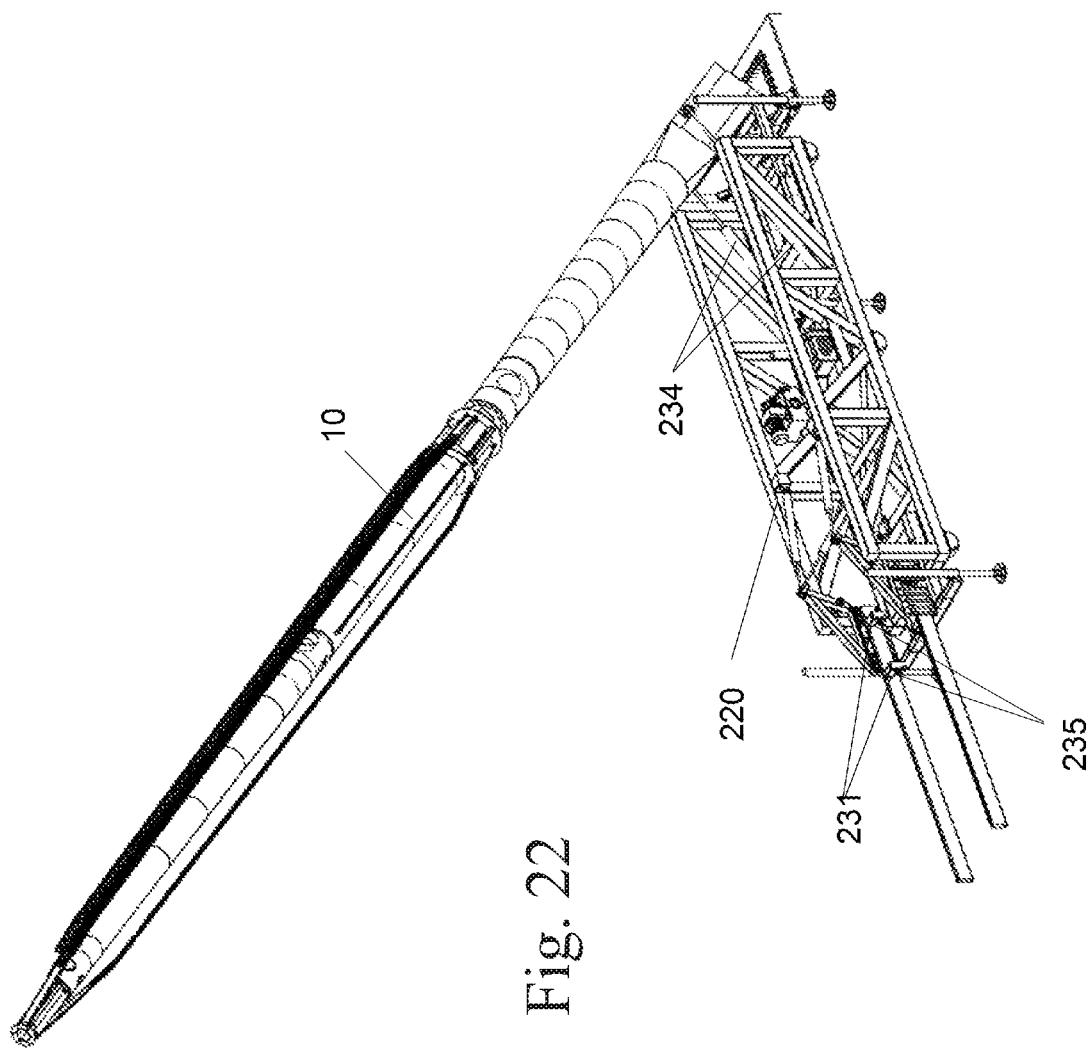

FIG. 22 shows the assembled turbine 10 raised part way to a vertical position. The turbine is released by hydraulic locking pins 235 at the connectors 231, and raised by hydraulic cylinders 234, which act as the erector for rotatably erecting the structure.

Figure 23:
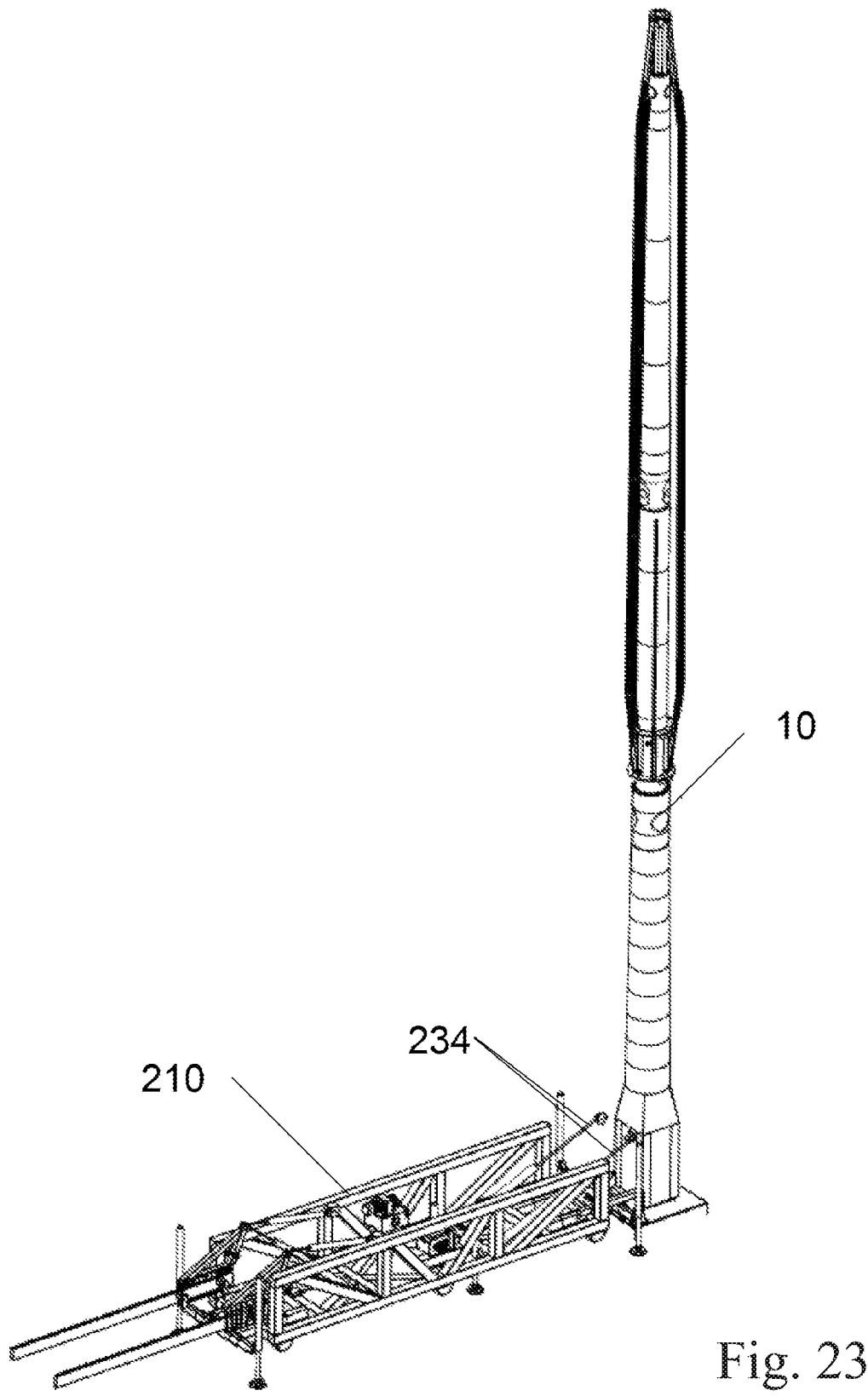
FIG. 23 shows the installation frame with the turbine in its erected position.

FIG. 23 shows the installation frame 210 with the turbine 10 in erected position. Once the turbine 10 is erected and secured to the footing 221, the two hydraulic cylinders 234 are detached from the turbine 10, and the hinge plates 218 and 219 in FIG. 17 may be removed.

Figure 24:
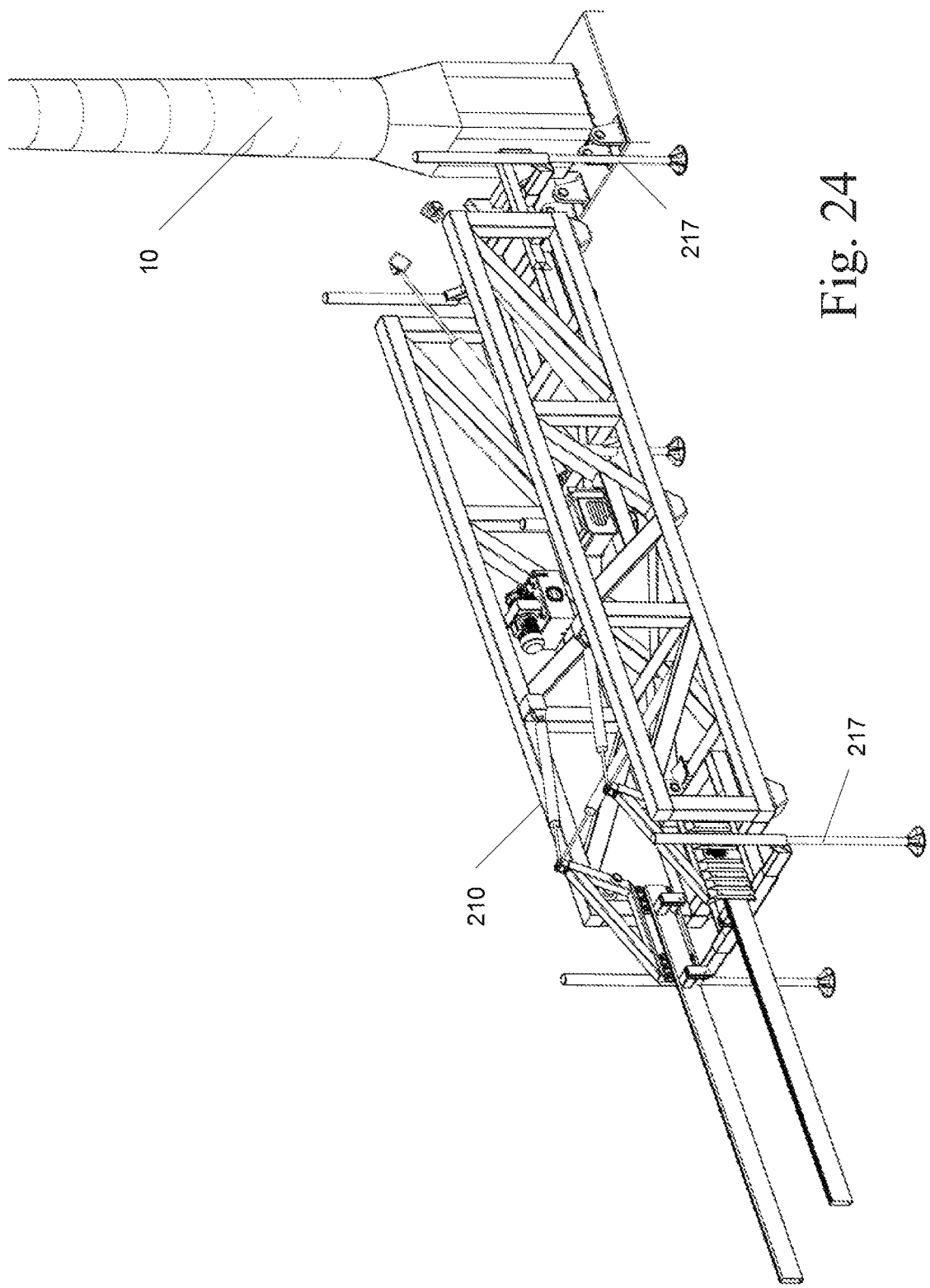
FIG. 24 shows the installation frame 210 raised on its outriggers 217 in readiness for transportation away from the erected turbine on a trailer.

FIG. 24 shows the installation frame 210 once again raised on its outriggers 217, positioned with sufficient height to clear a semi-trailer which is then used to transport the installation frame away from the installation site.

Referring to FIGS. 2-4 and FIG. 7, to deploy the blades once the turbine has been erected, first the hydraulic cylinders 432 of the articulated joints between segments of the blades are retracted to free the segments. Next the lower blade hub 340 is raised using the motors 330 and the racks 310 forcing the blades to adopt the arcuate configuration shown in FIG. 2. The hydraulic cylinders 432 are then again extended to lock the blade segments in their mutually inclined operating positions, and the hydraulic motors 330 are locked in position.

The above actions are reversible to collapse the blades into their straight position, either to protect the turbine against high winds or to enable the turbine to be lowered for repair.

Figure 25:
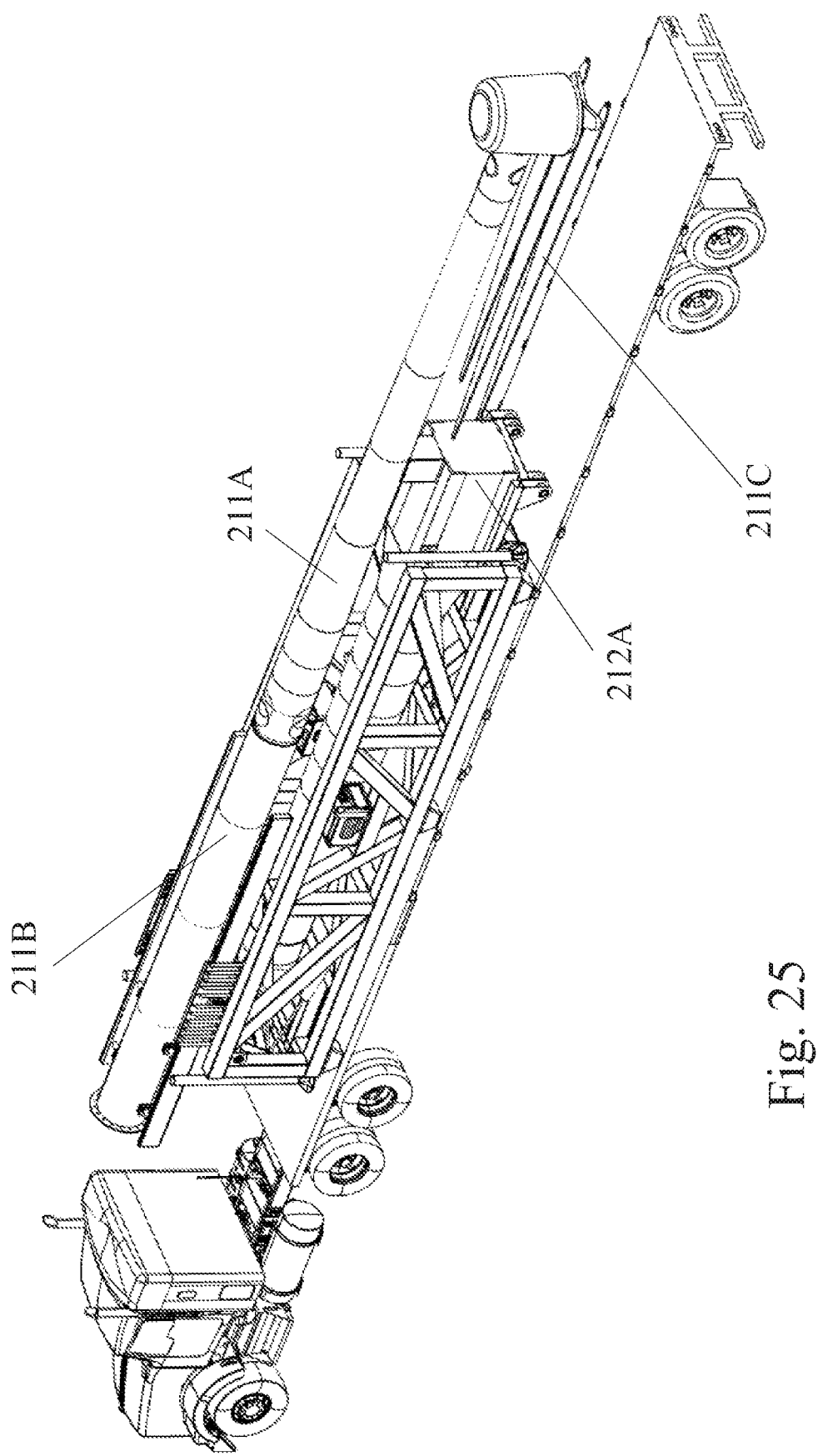
FIG. 25 depicts a perspective view of a horizontal axis wind turbine and an installation frame loaded onto a truck.
Figure 26:
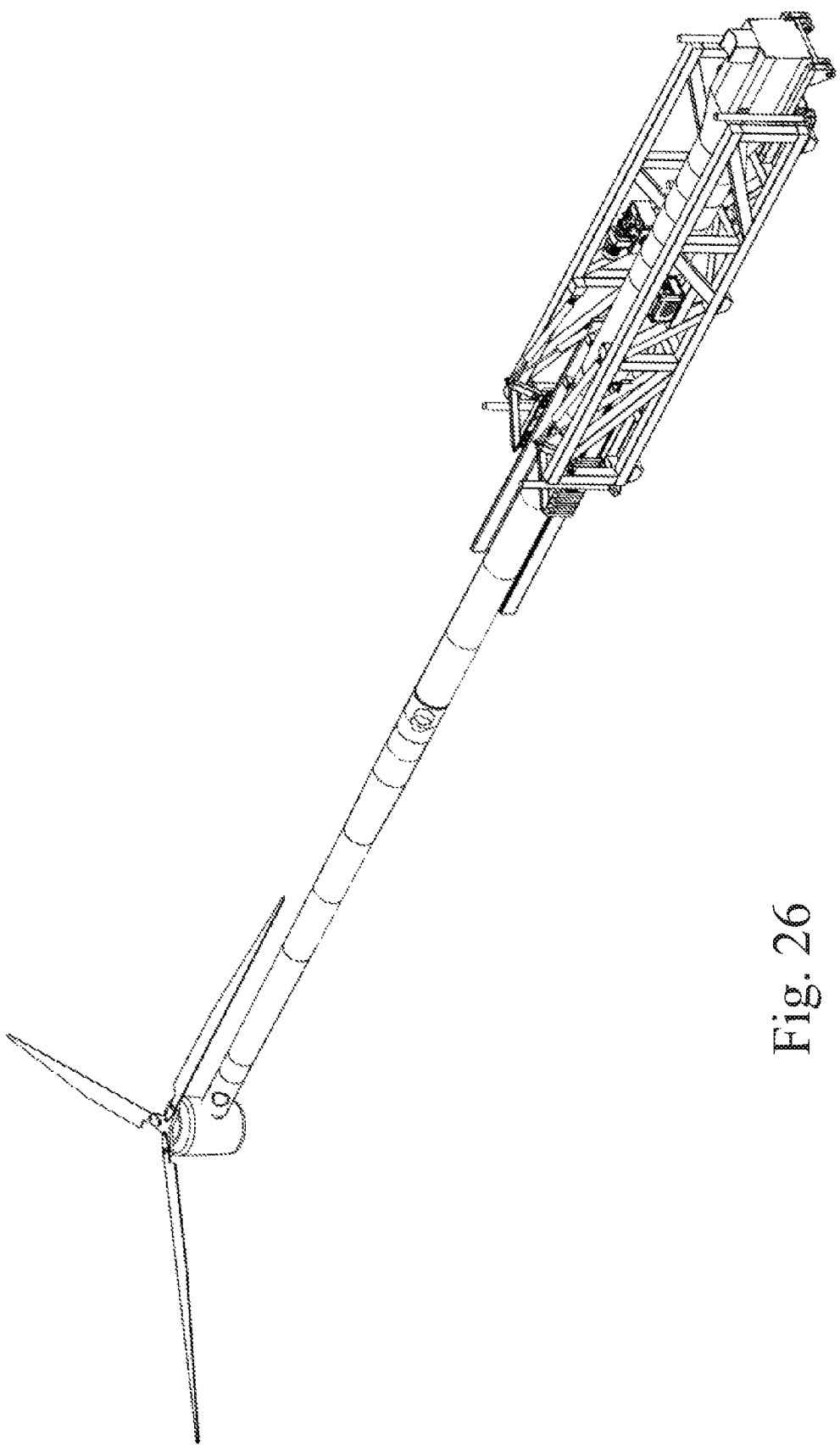
FIG. 26 depicts the installation assembly with the horizontal axis wind turbine assembled ready for erection.

FIGS. 25 and 26 depict an example of utilizing the installation assembly for assembling and erecting a horizontal axis wind turbine. FIG. 25 depicts the assembly in the transport configuration, wherein the upper section 211A, and the lower section 212A of the horizontal axis wind turbine 211B are disposed within the respective receivers. For ease of transportation the blades 211C are folded, or alternatively shipped disassembled from the turbine. FIG. 26 depicts the horizontal wind turbine ready to be erected, with the blade extended in their operational position.

Figure 27:
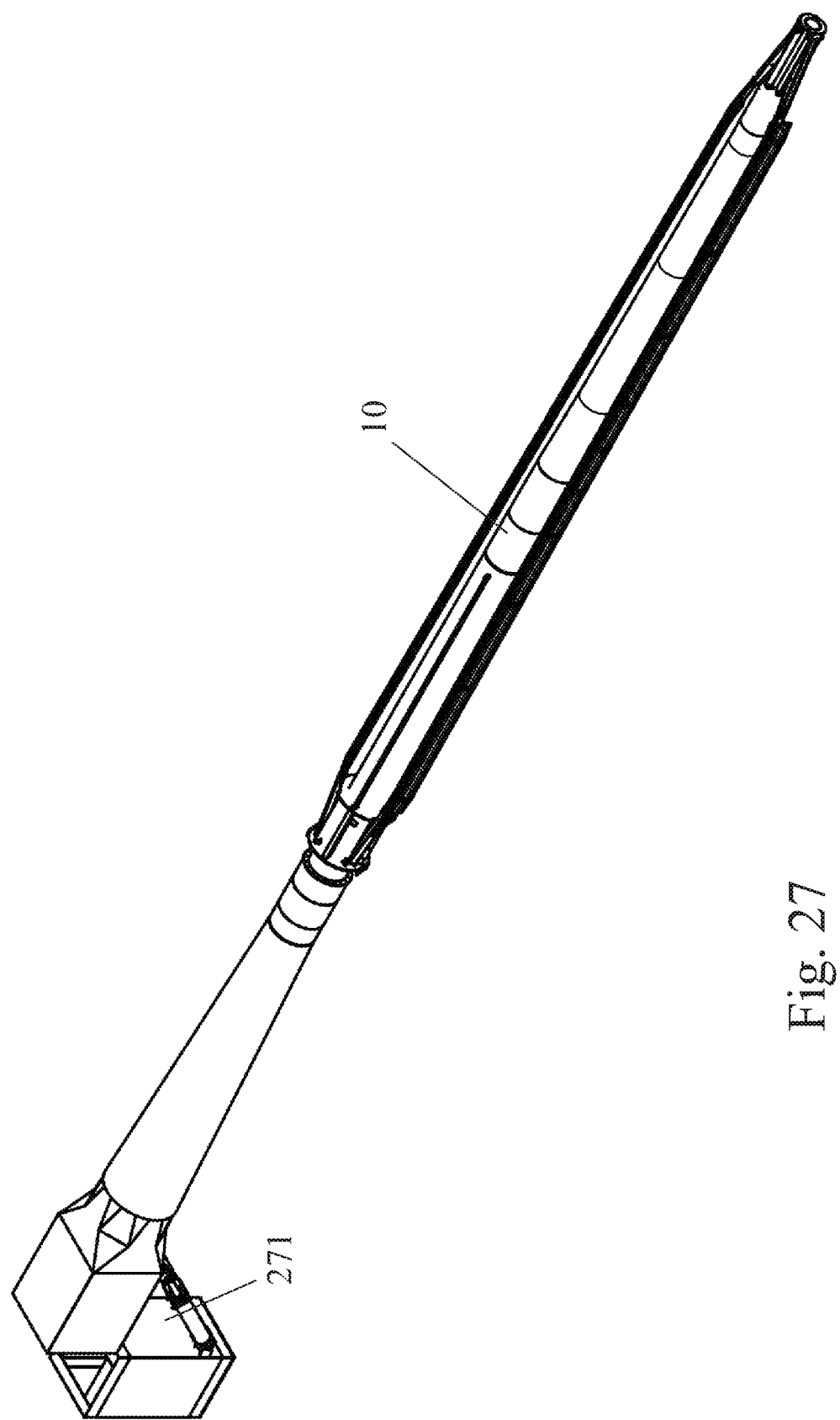
FIG. 27 depicts the turbine in horizontal position, with two hydraulic cylinders fitted for the purpose of raising and lowering the turbine.
Figure 28:
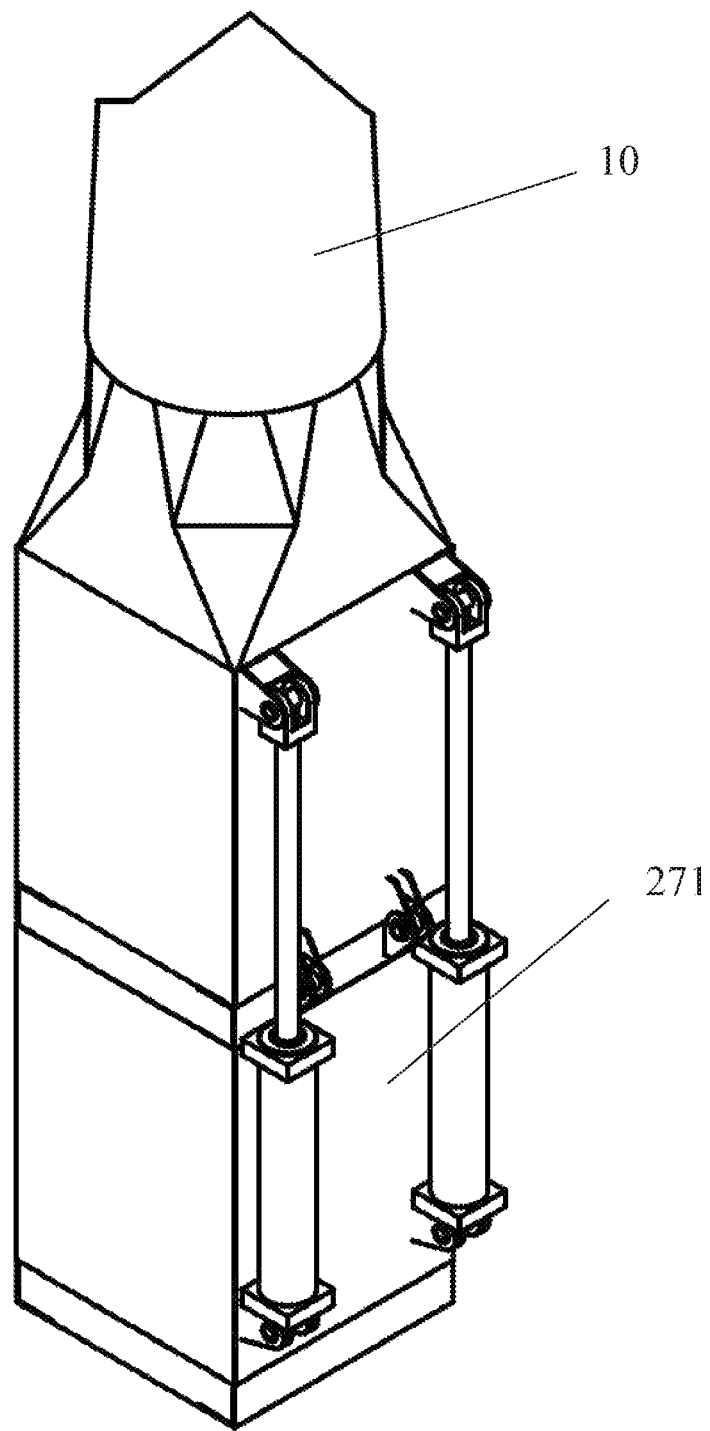
FIG. 28 depicts the turbine of FIG. 27 in a vertical position.

FIGS. 27 and 28 depict an alternative method of raising the turbine 10, by two hydraulic cylinders 271 fitted at the base of the turbine. This alternative method has the advantage that the turbine may be raised and lowered on subsequent occasions after installation, without the need for the installation frame, provided that a source of hydraulic power is made available.

The embodiment of the invention described above provides the following advantages:

The turbine and erection equipment may be transported using a single truck and trailer.

The turbine may be installed with only a small team of workers, no lifting equipment is required, and no workers are required to work at significant height above the ground.

The turbine may be installed in a short period of time, as no lifting equipment is required, and the number of manual assembly operations is relatively small.

The turbine blades may be folded flat at any time, and subsequently re-opened, without the need for any external equipment. This operation may be carried out under local control or under remote control. This is a practical advantage for locations where hurricanes are prevalent.

The same installation frame may be re-used for several turbine installations.

By reversing the order of the above installation operations, a method is provided whereby the turbine may be lowered and/or removed at low cost.

Aspects of the design may be applied to turbines of various sizes.

Taking advantage of all the above features, the turbine may be built cost-effectively in large production runs and installed quickly at comparatively low cost, while also providing the inherent advantages of vertical axis turbines, which do not require repeated re-orientation in the direction of the wind, offer pleasing appearance, have few moving parts, and do not generate the characteristic undulating noise of horizontal axis turbines associated with blades passing close to the mast.

The invention claimed is:

1. A fluid turbine comprising:
a rotor rotatable about an axis disposed in use substantially transverse to the direction of fluid flow;
the rotor having a plurality of arcuate blades, each having an opposite upper and lower ends connected to the rotor via an upper and lower hubs respectively, the upper and lower hubs being coupled to the rotor, the plurality of blades being selectively movable between an open state and a closed state;
wherein at least one blade of the plurality of arcuate blades is formed of at least three segments coupled by joints, at least two of the joints being articulated for permitting the mutual inclination of at least two mutually adjacent segments of the at least three blade segments, to be varied while the ends of the blade are coupled to the rotor; and,
a locking mechanism configured to selectably lock at least one of the articulated joints in at least one position, thereby locking the at least two adjacent segments in at least one mutual inclination;
at least the lower hub being displaceable vertically in the axial direction of the rotor.

2. A fluid turbine as claimed in claim 1, wherein the mutual inclination between the two mutually adjacent segments is selectable between at least two mutual inclinations.

3. A fluid turbine as claimed in claim 2, wherein the mutual inclinations are selected by a remote control.

4. A fluid turbine as claimed in claim 1, wherein the locking mechanism being disposed at least partially within at least one of the at least two mutually adjacent segments.

5. A fluid turbine as claimed in claim 1, wherein at least one end of each arcuate blade is secured to the rotor via a hinged connection.

6. A fluid turbine as claimed in claim 1 wherein at least one of the at least three segments forms a hollow cavity therewithin.

7. A fluid turbine as claimed in claim 6, further comprising at least one hose disposed within the cavity.

8. A fluid turbine as claimed in claim 6, wherein at least one segment of the at least three segments is heated during operation by heated fluid introduced to the cavity thereof.

9. A fluid turbine as claimed in claim 6, further comprising at least one cable disposed within the cavity.

10. A fluid turbine as claimed in claim 6, further comprising at least one electrical wire disposed within the cavity.

11. A fluid turbine as claimed in claim 1, wherein at least one of the at least three segments of at least one blade of the plurality of blades is straight when unstressed.

12. A fluid turbine as claimed in claim 1, further comprising at least one hydraulic cylinder coupled between the lower hub and at least one of the plurality of blades, for facilitating moving of the plurality of blades between the open and closed states.

13. A fluid turbine as claimed in claim 1, further comprising:
at least one rack coupled to or integral to the rotor;
at least one hydraulic motor coupled to the lower hub and engaging the rack, the lower hub being movable about the axial direction of the engagement of the at least one hydraulic motor and the at least one rack.

* * * * *